United States Patent [19]

Tam

[11] Patent Number: 5,257,183
[45] Date of Patent: Oct. 26, 1993

[54] METHOD AND APPARATUS FOR CONVERTING CONE BEAM X-RAY PROJECTION DATA TO PLANAR INTEGRAL AND RECONSTRUCTING A THREE-DIMENSIONAL COMPUTERIZED TOMOGRAPHY (CT) IMAGE OF AN OBJECT

[75] Inventor: Kwok C. Tam, Schenectady, N.Y.

[73] Assignee: General Electric Company, Schenectady, N.Y.

[21] Appl. No.: 631,815

[22] Filed: Dec. 21, 1990

[51] Int. Cl.$^5$ ............................................. G06F 15/42
[52] U.S. Cl. ........................... 364/413.19; 364/413.14
[58] Field of Search ...................... 364/413.13, 413.14, 364/413.15, 413.16, 413.18, 413.19, 413.22; 382/6; 378/901

[56] References Cited

U.S. PATENT DOCUMENTS 5,068,882 11/1991 Eberhard ................................. 378/4
5,073,910 12/1991 Eberhard et al. ....................... 378/4

OTHER PUBLICATIONS

"Three-Dimensional Tomographic Image Reconstruction from Cone Beam Projections by Single Scanning Method", by H. Kudo et al., Systems and Computers in Japan, vol. 21, No. 11, pp. 86-95 (1990).
"On a Problem in Radiotherapy: Questions of Non-Negativity", by A. M. Cormack et al., International Journal of Image Systems and Technology, vol. 1, No. 2, pp. 120-124 (1989).
"Convolutional Reconstruction from Cone-Beam Projection Data", G. N. Minerbo, IEEE Trans. Nucl. Sci., vol. NS-26, No. 2, pp. 2682-2684 (Apr. 1979).
"Practical Cone-Beam Algorithm", L. A. Feldkamp et al., J. Opt. Soc. Am. A., vol. 1, No. 6, pp. 612-619 (Jun. 1984).
"Image Reconstructiton from Cone-Beam Projections: Necessary and Sufficient Conditions and reconstruction Methods", IEEE Trans. Med. Imag., vol. MI-44, pp. 14-25 (Mar. 1985).
P. Grangeat, "Analysis of a 3D Imaging System by Reconstruction from X Radiographies in Conical Geometry", Ph.D. Thesis, National College of Telecommunications (l'Ecole Nationale Superieure des Telecommunications), France (1987) [translation enclosed].

Primary Examiner—Robert A. Weinhardt
Assistant Examiner—David Huntley
Attorney, Agent, or Firm—Paul R. Webb, II

[57] ABSTRACT

Method and apparatus for converting x-ray cone beam data (line integrals through an object) to Radon data (planar integrals) for 3D CT image reconstruction by inverse Radon transformation. The radial derivative of each planar integral is determined by integrating to determine weighted line integrals along each of a pair of lines on a normalized detector plane, which lines are defined as intersections with the normalized detector plane of a corresponding pair of integration planes sharing a rotation axis and rotated with respect to each other by a rotation angle $\delta\beta$, and then dividing the difference between the weighted line integrals by the rotation angle $\delta\beta$. The procedure can be employed to convert the cone beam data to values representing planar integrals on any arbitrary set of planes in Radon space, such as a set of coaxial vertical planes.

8 Claims, 14 Drawing Sheets $\int X(\theta) d\theta = \iint f(r,\theta,z_0) dr d\theta$ $\hat{f}(x,y,z)$ $X(\theta) = \int f(r,\theta,z_0) dr$ $\hat{X}(\theta) = \int f(x,y,z) ds$ $f(x,y,z)$ $\iint f(r,\theta,z_0) dr d\theta$

RADON DATA ON
VERTICAL PLANES

OBJECT FRAME OF REFERENCE

DETECTOR FRAME OF REFERENCE

CONE BEAM DATUM AT θ = $\int_Q f(r,\theta)\,dr$

PLANE OF FIGURE = PLANE W

METHOD AND APPARATUS FOR CONVERTING CONE BEAM X-RAY PROJECTION DATA TO PLANAR INTEGRAL AND RECONSTRUCTING A THREE-DIMENSIONAL COMPUTERIZED TOMOGRAPHY (CT) IMAGE OF AN OBJECT

CROSS-REFERENCE TO RELATED APPLICATIONS

The invention disclosed and claimed herein is related to the subject matter of the following commonly-assigned patent applications, the entire disclosures of which are hereby expressly incorporated herein by reference:

Ser. No. 631,818, filed concurrently herewith, by Kwok C. Tam, entitled "PARALLEL PROCESSING METHOD AND APPARATUS FOR RECONSTRUCTING A THREE-DIMENSIONAL COMPUTERIZED TOMOGRAPHY (CT) IMAGE OF AN OBJECT FROM CONE BEAM PROJECTION DATA OR FROM PLANAR INTEGRALS" [RD-19564]; and Ser. No. 631, 514, filed concurrently herewith, by Kwok C. Tam, entitled "METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM PROJECTION DATA" [RD-19695].

BACKGROUND OF THE INVENTION

The present invention relates generally to three-dimensional (3D) computerized tomography (CT) and, more particularly, to methods and apparatus for converting x-ray cone beam data to planar integrals for 3D image reconstruction through inverse Radon transformation.

In conventional computerized tomography for both medical and industrial applications, an x-ray fan beam and a linear array detector are employed. Two-dimensional (2D) imaging is achieved. While the data set is complete and image quality is correspondingly high, only a single slice of an object is imaged at a time. When a 3D image is required, a "stack of slices" approach is employed. Acquiring a 3D data set a 2D slice at a time is inherently tedious and time-consuming. Moreover, in medical applications, motion artifacts occur because adjacent slices are not imaged simultaneously. Also, dose utilization is less than optimal, because the distance between slices is typically less than the x-ay collimator aperture, resulting in double exposure to many parts of the body.

A more recent approach, based on what is called cone beam geometry, employs a two-dimensional array detector instead of a linear array detector, and a cone beam x-ray source instead of a fan beam x-ray source. At any instant the entire object is irradiated by a cone beam x-ray source, and therefore cone beam scanning is much faster than slice-by-slice scanning using a fan beam or a parallel beam. Also, since each "point" in the object is viewed by the x-rays in 3D rather than in 2D, much higher contrast can be achieved than is possible with conventional 2D x-ray CT. To acquire cone beam projection data, an object is scanned, preferably over a 360° angular range, either by moving the x-ray source in an appropriate scanning trajectory, for example, a circular trajectory around the object, while keeping the 2D array detector fixed with reference to the source, or by rotating the object while the source and detector remain stationary. In either case, it is relative movement between the source and object which effects scanning.

Most image reconstruction procedures in x-ray CT are based on the Radon inversion process, in which the image of an object is reconstructed from the totality of the Radon transform of the object. The Radon transform of a 2D object consists of integrals of the object density on lines intersecting the object. The Radon transform of a 3D object consists of planar integrals. The cone beam data, however, are not directly compatible with image reconstruction through inverse Radon transformation, which requires the sue of planar integrals of the object as input. Consequently, image reconstruction by inversion from cone beam scanning data generally comprises two steps: (1) convert the cone beam data to planar integrals, and (2) perform an inverse Radon transform on the planar integrals to obtain the image. The present invention is primarily directed to efficient methods and apparatus for converting x-ray cone beam data to planar integrals, or values representing planar integrals, on a set of arbitrary planes in Radon space. The above-incorporated application Ser. No. 631,818 [RD-19564] discloses a two-step method for performing an inverse Radon transform starting with planar integrals on a set of coaxial vertical planes in Radon space. Thus the invention disclosed herein may be employed to convert x-ray cone beam data to values representing planar integrals on a set of coaxial vertical planes in Radon space, and the invention of application Ser. No. 631,818 [RD-19564] may be employed to perform the inverse Radon transformation portion of the 3D image reconstruction.

One method for converting cone beam data to planar integrals is disclosed in Gerald N. Minerbo, "Convolutional Reconstruction from Cone-Beam Projection Data", IEEE Trans. Nucl. Sci., Vol. NS-26, No. 2, pp. 2682–2684 (Apr. 1979). Unfortunately, as is discussed, for example, in L. A. Feldkamp, L. C. Davis, and J. W. Kress, "Practical Cone-Beam Algorithm", J. Opt. Soc. Am. A., Vol. 1, No. 6, pp. 612–619 (Jun. 1984), the derivation in Minerbo contains an error which cannot easily be rectified and which renders the result invalid.

In Bruce D. Smith, "Image Reconstruction from Cone-Beam Projections: Necessary and Sufficient Conditions and Reconstruction Methods", IEEE Trans. Med. Image., Vol MI-44, pp. 1425 (Mar. 1985), there is disclosed a method for converting from cone beam data the one-dimensional convolution of the planar integrals with the Horn's kernel. Since the convolution mixes together the planar integrals on all the planes, the computation of one point of the convolved result requires all the data on the detector at one view angle. Thus the task is very computationally intensive.

In P. Grangeat, "Analysis of A 3D Imaging System by Reconstruction from X Radiographies in Conical Geometry" ("Analyse d'un System D-Imagerie 3D par Reconstruction a partir de Radiographies X en Geometrie conique"), Ph.D. Thesis, National College of Telecommunications (I-Ecole Nationale Superieure des Telecommunications), France (1987), a technique is disclosed for computing the derivative of the planar integrals from cone beam data. The computed data points, however, reside on a set of great circles on a spherical shell in Radon space. These great circles in general do not fall on any arbitrary set of planes in Radon spaces, and do not fall on a set of coaxial vertical planes in Radon space. Thus they are not suitable for input to inverse Radon transformation. It would require an extensive effort in three-dimensional interpolation to get the data on the vertical planes to be sued in inverse Radon transformation, and furthermore interpolation would introduce errors into the data.

SUMMARY OF THE INVENTION

Accordingly, it is an object of the invention to provide methods and apparatus for converting x-ray cone beam data to values representing planar integrals on any arbitrary set of planes in Radon space for 3D image reconstruction through inverse Radon transformation.

It is a more specific object of the invention to provide methods and apparatus for converting x-ray cone beam data to values representing planar integrals on a set of coaxial planes in Radon space for 3D image reconstruction through inverse Radon transformation.

It is another object of the invention to provide such methods and apparatus which require, for each view angle, only two closely spaced lines of data on the detector to compute a value representing a planar integral, in contrast to prior art approaches requiring all data on the detector It is another object of the invention to provide methods and apparatus which are exact and do not require interpolation for converting x-ray cone beam data to values representing planar integrals on a set of coaxial planes in Radon space, or any arbitrary set of planes in Radon space, for 3D image reconstruction through inverse Radon transformation.

It is yet another object of the invention to provide methods and apparatus which minimize the amount of computation required to convert x-ray cone beam data to values representing planar integrals on a set of coaxial planes in Radon space, or any arbitrary set of planes in Radon space, for 3D image reconstruction through inverse Radon transformation.

In accordance with the invention, there is provided a method for reconstructing a 3D image of an object from cone beam projection data, where the cone beam projection data is in the form of line integrals through the object organized, for each of a plurality of x-ray source positions $S_i$, as a 2D data set on a normalized detector plane containing an origin and perpendicular to a line from each particular source position $S_i$ to the origin. The method includes the tow overall steps of determining values representing planar integrals on a set of planes $\phi_j$ in Radon space, and then performing an inverse Radon transform on the values representing planar integrals on the set of planes $\phi_j$ to reconstruct an image of the object. In more particular embodiments, the planes $\phi_j$ comprise a set of coaxial planes containing a reference axis intersecting the origin.

A significant aspect of the invention is the determination of the value of a planar integral or Radon datum (actually the radial derivative of the Radon datum) at a particular point in Radon space by integrating to determine weighted line integrals along each of a pair of lines on the normalized detector plane, which lines are defined as intersections with the normalized detector plane of a corresponding pair of integration planes sharing a rotation axis and rotated with respect to each other by a rotation angle $\delta\beta$, and then dividing the difference between the weighted line integrals by the rotation angle $\delta\beta$.

Specifically, the step of determining values representing planar integrals on a set of planes $\phi_j$ in radon space includes the nested steps of, each of the source positions $S_i$, defining in Radon space a corresponding spherical shell on which Radon data can be determined, intersections of the planes $\phi_j$ with the spherical shell corresponding to the particular source position $S_i$ defining a set of circles $D_{ij}$ on the spherical shell, and for each of the circles $D_{ij}$, defining a rotation axis as a line through the particular source position $S_i$, intersecting the particular circle $D_{ij}$, and orthogonal to the plane of the particular circle $D_{ij}$, defining a st of coaxial integration planes $Q_{ijk}$ each of the integration planes $Q_{ijk}$ containing the particular rotation axis and intersecting the particular circle $D_{ij}$ to define the location of a Radon datum point $R_{ijk}$, and the integration planes $Q_{ijk}$ intersecting the normalized detector plane on respective lines $L_{ijk}$, and for each of the lines $L_{ijk}$ on the normalized detector plane, rotating the corresponding integration plane $Q_{ijk}$ by a small rotation angle $\delta\beta$ to define a plane $Q_{ijk}'$, intersecting the normalized detector plane on a corresponding line $L_{ijk}'$, integrating along the lines $L_{ijk}$ and $L_{ijk}'$ to determine respective weighted line integrals $J_{ijk}$ and $J_{ijk}'$, and dividing the difference between the weighted line integrals $J_{ijk}$ and $J_{ijk}'$ by the rotation angle $\delta\beta$ to yield the radial derivative of the Radon datum at the particular point $R_{ijk}$.

Similarly, apparatus in accordance with the invention for reconstructing a 3D image of an object from cone beam projection data includes means, such as programmed computer, for determining values representing planar integrals on a set of planes $\phi_j$ in Radon space employing the procedures summarized above, and means, such as the processing apparatus disclosed in application Ser. No. 631, 818 [RD-19564] for performing an inverse Radon transform on the values representing the planar integrals on the set of planes $\phi_j$ to reconstruct an image of the object.

In the more particular embodiments where the planes $\phi_j$ comprise a set of coaxial planes containing a reference axis intersecting the origin, the step of determining values representing planar integrals on the set of planes $\phi_j$ preferably includes the nested steps of, for each source position Si not on the reference axis, defining in Radon space a corresponding circle $G_i$ on the corresponding spherical shell in a plane containing the particular source position $S_i$ and perpendicular to the planes $\phi_j$, intersections of the planes $\phi_j$ and the circles $D_{ij}$ with the particular circle $G_i$ defining on the circle $G_i$ a plurality of points $P_{ij}$ corresponding to the circles $D_{ij}$, projecting the corresponding circle $G_i$ from the particular source position $S_i$ to a line $M_i$ on the normalized detector plane, the points $P_{ij}$ projecting to corresponding points $C_{ij}$ on the lie $M_i$, and for each projecting point $C_{ij}$ on the normalized detector plane, constructing lines $L_{ijk}$ on the normalized detector plane at a plurality of orientations passing through the projected point, the lines $L_{ijk}$ being intersections on the normalized detector plane of corresponding integration planes $Q_{ijk}$ each containing a rotation axis along a line passing through the particular source position $S_i$, the particular point $P_{ij}$, and the particular projected point $C_{ij}$, rotating each of the lines $L_{ijk}$ on the normalized detector plane about the projected point $C_{ij}$ by a small angle $\delta\theta$ to define a line $L_{ijk}'$ which is the intersection of a plane $Q_{ijk}'$ containing the particular rotation axis with the normalized detector plane, and determining the rotation angle $\delta\beta$ between the planes $Q_{ijk}$ and $Q_{ijk}'$ by geometry from the angle $\delta\beta$, integrating along the lines $L_{ijk}$ and $L_{ijk}'$ to determine respective weighted line integrals $J_{ijk}$ and $J_{ijk}'$, and dividing the difference between the weighted line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

In the more particular embodiments where the planes $\phi_j$ comprise a set of coaxial planes containing a reference axis intersecting the origin, the step of determining values representing planar integrals on the set of planes $\phi_j$ includes the nested steps of, for each source position $S_i$ on the reference axis, for each plane $\phi_j$ intersecting the spherical shell corresponding to the particular source position $S_i$ and defining a particular circle $D_{ij}$, projecting the particular circle $D_{ij}$ from the particular source position $S_i$ to a line $L_{ij*}$ on the normalized detector plane, constructing parallel lines $L_{ijk}$ on the normalized detector plane perpendicular to the line $L_{ij*}$, the lines $L_{ijk}$ being intersections on the normalized detector plane of corresponding integration planes $Q_{ijk}$ each containing a rotation axis along a line passing through the particular source position $S_i$ and orthogonal to the plane of the particular circle $D_{ij}$, translating each of the parallel lines $L_{ijk}$ by a small distance to define a line $L_{ijk}'$ which is the intersection of a plane $Q_{ijk}'$ containing the particular rotation axis with the normalized detector plane, and determining the rotation angle $\delta\beta$ between the planes $Q_{ijk}$ and $Q_{ijk}'$ by geometry from the distance between the lines $L_{ijk}$ and $L_{ijk}'$, integrating along the lines $L_{ijk}$ and $L_{ijk}'$ to determine respective weighted line integrals $J_{ijk}$ and $J_{ijk}'$, and dividing the difference between the weighted line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

BRIEF DESCRIPTION OF THE DRAWINGS

While the novel features of the invention are set forth with particularity in the appended claims, the invention, both as to organization and content, will be better understood and appreciated from the following detailed description taken in conjunction with the drawings, in which:

FIG. 4, depicts a set of coaxial vertical planes in Radon space;

DETAILED DESCRIPTION

Figure 1:
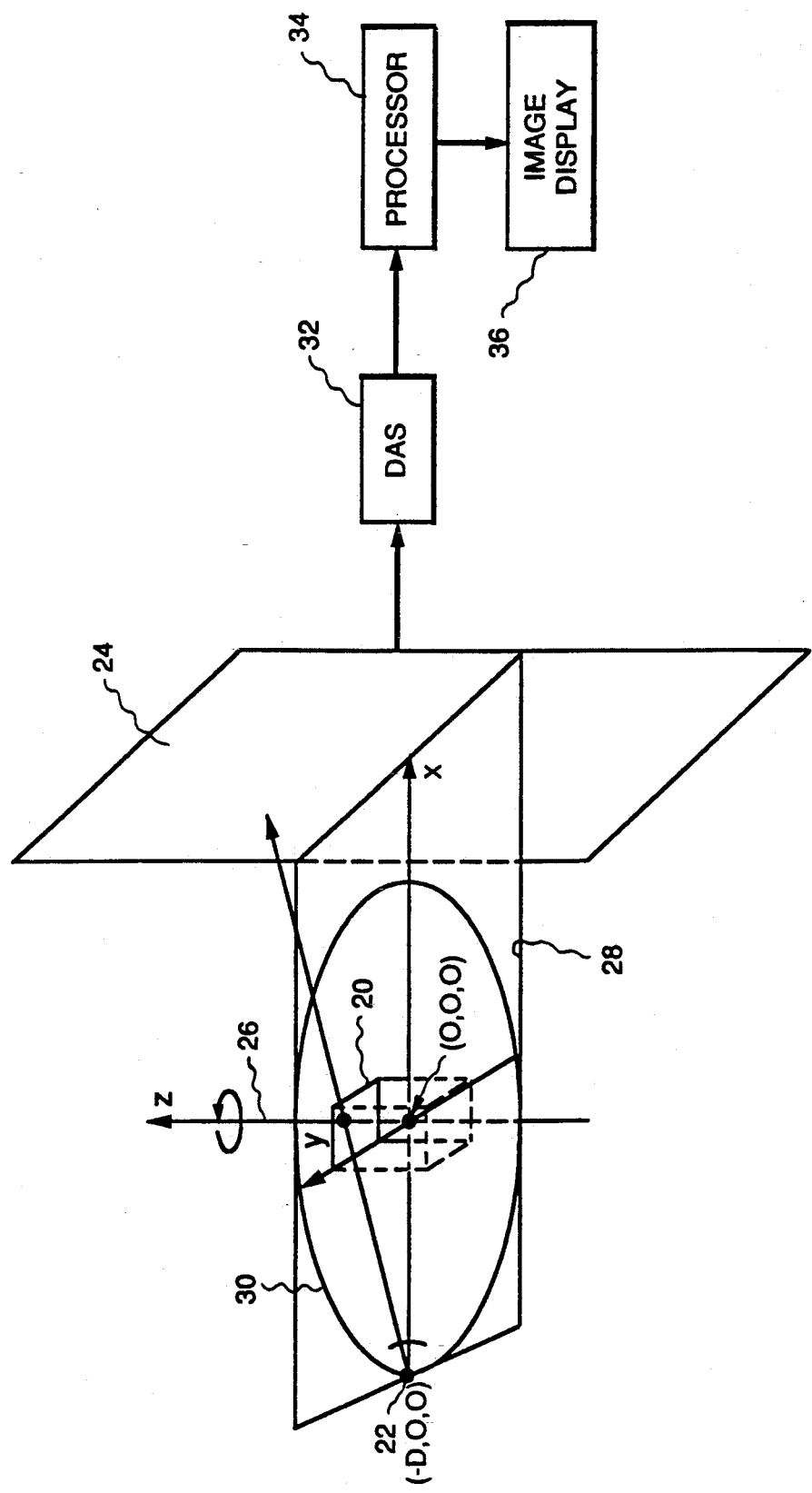
FIG. 1 depicts a cone beam scanning geometry for 3D CT connected to reconstruction apparatus embodying the invention.

Referring initially to FIG. 1, a typical scanning and data acquisition configuration employing cone beam geometry connected to reconstruction apparatus embodying the invention. An object 20 is positioned within a field of view between a cone beam x-ray point source 22 and a 2D detector array 24, which provides cone beam projection data. An axis of rotation 26 passes through the field of view and object 20. A midplane 28 may be defined which contains the x-ray point source 22 and is perpendicular to the axis of rotation 26. By convention, the axis of rotation 26 is referred to as the z-axis, and the intersection of the axis of rotation 26 and the midplane 28 is taken as the origin of coordinates. x and y axes lie in the midplane 28 as indicated. For scanning the object 20 at a plurality of source positions $S_i$, the source 22 moves relative to the object 20 and the field of view along an appropriate scanning trajectory 30, while the detector 24 remains fixed with respect to the source 22. In FIG. 1, the scanning trajectory 30 is for convenience of illustration shown as a circular scanning trajectory 30 lying the midplane 28, but other scanning trajectories may be employed and in fact are preferable, as in briefly discussed hereinbelow.

The detector array 24 is connected to a data acquisition system (DAS) 32. During operation, x-ray photons that penetrate the object are detected by x-ray detector array 24 and registered by the data acquisition system (DAS) 32. The photon counts, after being normalized by the air signals and converted to the negative of the logarithms, represent the line integrals through the object 20. Thus data are acquired at a number of source positions $S_i$ around the object 20 by scanning the source 22 and detector 24 along the scanning trajectory 30 (or equivalently rotating the object 20 while the source 22 and detector 24 remain stationary).

It should be noted, however, that the data set collected in such a single scan is incomplete, and artifacts may accordingly be introduced into the reconstruction, which may or may not be acceptable, depending on the particular application. Smith (1985, above) has shown that a cone beam data set is complete if there is a point for the x-ay source scanning trajectory on each plane passing through the object of interest (with the assumptions that the detector is locked in position relative to the source and large enough to span the object under inspection). A configuration suggested by Minerbo (1979, above) and by Heang K. Tuy, "An Inversion Formula for Cone-Beam Reconstruction", SIAM J. Math., Vol. 43, No. 3, pp. 546–552 (Jun. 1983), which Smith points out satisfies his condition for data completeness, is to employ two circular source scanning trajectories which are perpendicular to each other. Another scanning configuration which achieves data completeness is disclosed in commonly-assigned U.S. patent application Ser. No. 07/572,651filed Aug. 27, 1990, by Eberhard et al. and entitled "SQUARE WAVE CONE BEAM SCANNING TRAJECTORY FOR DATA COMPLETENESS IN THREE-DIMENSIONAL COMPUTERIZED TOMOGRAPHY". Alternatively, instead of acquiring a complete cone beam x-ray data set, the invention of the above-incorporated application Ser. No. 631,514 [RD-19695] may be employed, using optically-acquired object boundary information to interactively correct for missing data during the inverse Radon transform process.

The data acquisition system (DAS) 32 is connected to a representative processor 34 which serves to reconstruct a 3D image of the object 20 by calculating planar integrals on a set of planes from the line integrals through the object 20 in accordance with the invention, and performing an inverse Radon transform on the planar integrals to reconstruct a three-dimensional image of the object 20. A suitable image display 36 is connected to the representative processor 34 as an output device.

Referring now to FIGS. 2A through 2f and FIG. 3, represented in general is the Radon transform approach to 3D imaging.

Figure 2C:
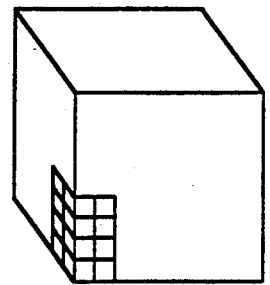
FIG. 2a, 2b, 2c, 2d, 2e and 2f are diagrams depicting the Radon transform approach to 3D CT imaging.
Figure 2F:
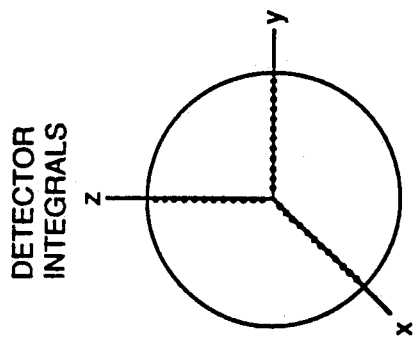
Figure 2B:
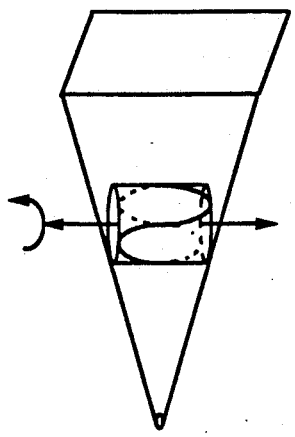
Figure 2E:
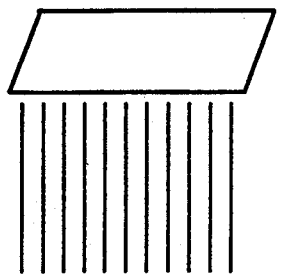
Figure 2A:
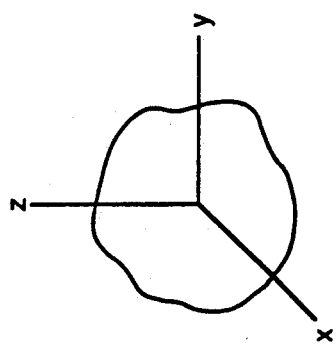
Figure 2D:
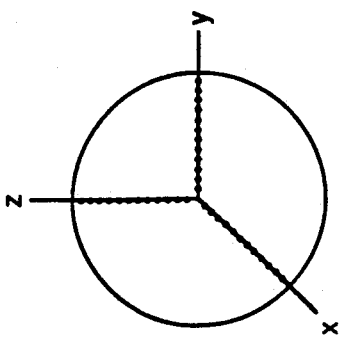

Specifically, the object itself is defined in terms of its x-ray attenuation coefficient $f(x,y,z)$ (FIG. 2a). The measured cone beam projection data then corresponds to a line integral of this function over the radial direction $X(\theta) = \int f(r,\theta,z_0)dr$ (FIG. 2b). The line integrals of the detector data (also know as detector integrals) are given by $\int X(\theta)d\theta = \int\int f(r,0,z_0)dr\, d\theta$(FIG. 2C). In the parallel beam case, these detector integrals are simply equal to the Radon transform of the object. In the cone beam case, however, the Radon transform is given instead by $\int\int f(r,\theta,z_0)r\, dr\, d\theta$ (FIG. 2d). The additional factor of r in the Radon transform integral results from the Jacobian of the coordinate transformation from Cartesian to polar coordinates. As depicted in FIGS. 2e and 2f, an inverse Radon transform procedure reconstructs a 3D CT image from the detector integrals. Since direct inverse Radon transformation requires planar integrals of the object as input, a preliminary step of converting line integrals (cone beam detect integrals) to planar integrals (Radon data) is required, to which the present invention is directed.

Figure 3:
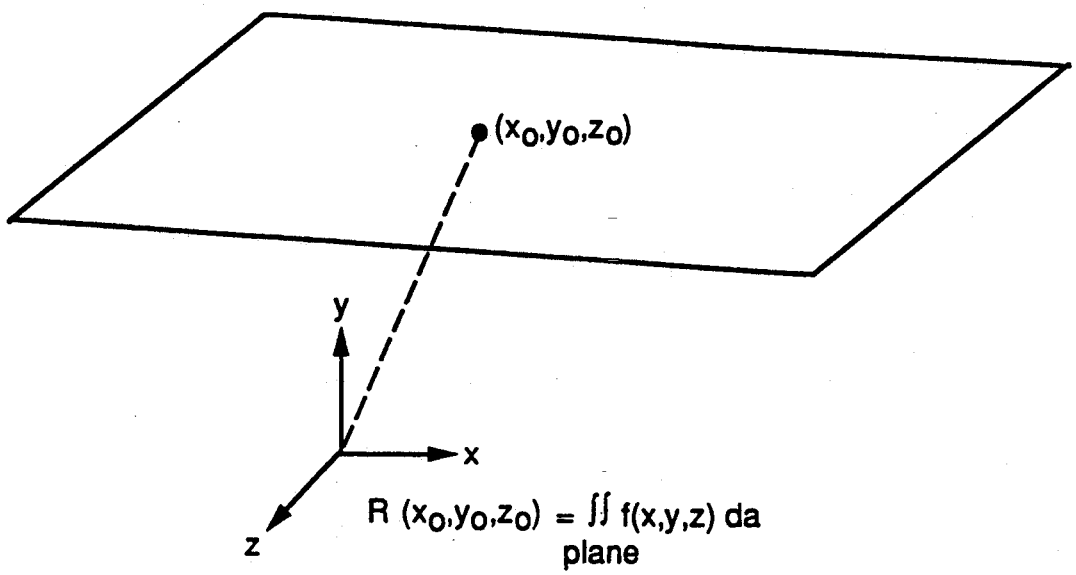
FIG. 3 is a representation of the 3D Radon transform of an object at a given point.

As depicted in FIG. 3, the 3D Radon transform of an object at a point $x_0, y_0, z_0$ is given by the area integral of the x-ray attenuation coefficient over the plane passing through $x_0, y_0, z_0$ that is perpendicular to the line from the origin to $x_0, y_0, z_0$, and can be expressed as $$R(x_0, y_0, z_0 0) = \iint_{plane} f(x, y, z)da \quad (1)$$

For a 2D radon transform, the situation is similar, except that the integral is over a line, not over a plane.

The planar integral can also be expressed as $$R(s,\hat{n}) = \int d^3r \delta(s - r\cdot\hat{n}) f(r) \quad (2)$$

where $\hat{n} = (\sin\theta\cos\phi, \sin\theta\sin\phi, \cos\phi)$ is a direction vector characterizing the normal to the plane; s is the distance of the plane from the origin; and $f(r)$ is the 3D object.

In words, $R(s,\hat{n})$ represents the integrated density of the object on the plane whose normal is $\hat{n}$ and which is at a distance s from the origin. The planar integral $R(s,\hat{n})$ is also referred to as Radon data.

The inverse Radon transformation by which a 3D object $f(r)$ can be reconstructed from its planar integrals R can be expressed as $$f(r) = \frac{-1}{8\pi^2} \int\int\int d\phi d(\cos\theta)ds \frac{\partial^2}{\partial s^2} R(s,\hat{n})\delta(s - r\cdot\hat{n}) \quad (3)$$

As described in detail in the above-incorporated application Ser. No. 631,818 (RD-19564), the inverse Radon transformation expressed in Equation (3) can be achieved through a two-step process. Step 1 comprises 2D CT image reconstructions on a number of vertical planes $\phi_j$ in Radon space each containing the z axis. Step 2 comprises 2D CT image reconstructions on a number of horizontal planes.

Figure 4:
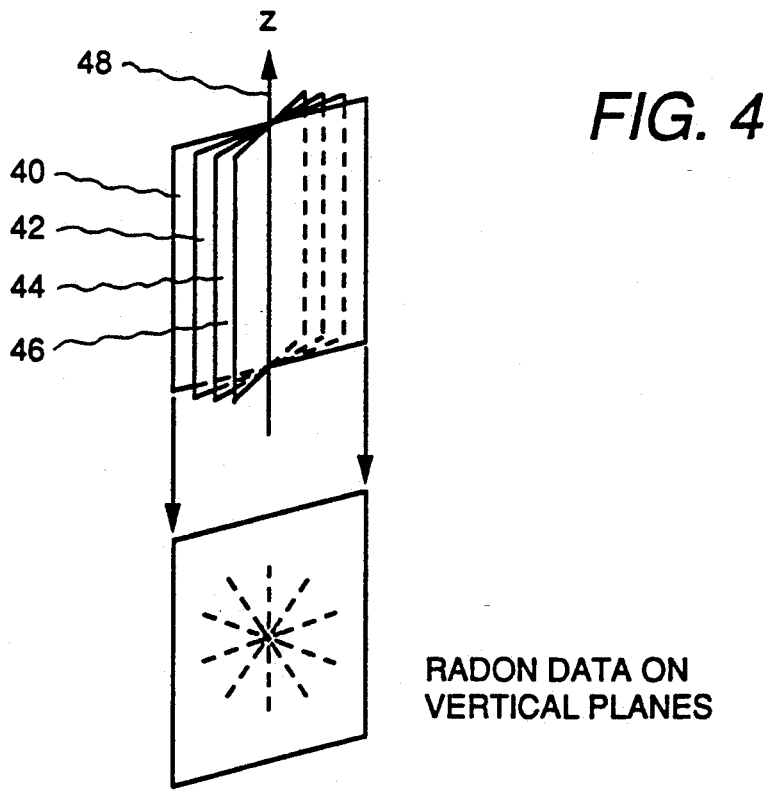
FIG. 4 depicts a set of coaxial planes $\phi_j$ in Radon space each containing a vertical or reference axis on which Radon data (planar integrals) are to be determined.

Thus, as represented in FIG. 4, what is required as input to the inverse Radon transformation are planar integrals determined and organized on a plurality of plane $\phi_j$ containing a reference axis in Radon space, for example, on vertical planes 40, 42, 44 and 46 containing a vertical reference or z axis 48.

Described in detail herein are methods and apparatus for converting the x-ray cone beam data to the planar integrals on the set of coaxial vertical planes $\phi_j$, or on any arbitrary set of planes, as input for inverse Radon transformation.

Figure 5A:
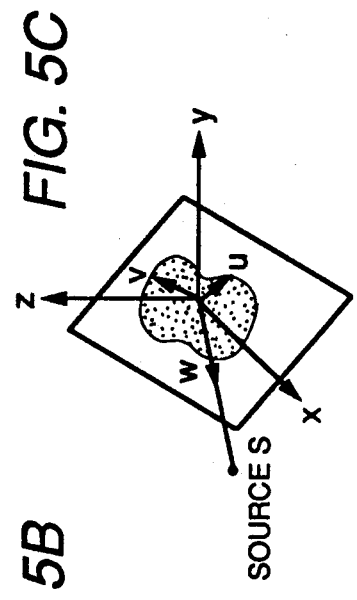
FIG. 5A depicts an object frame of reference and coordinate system.
Figure 5B:
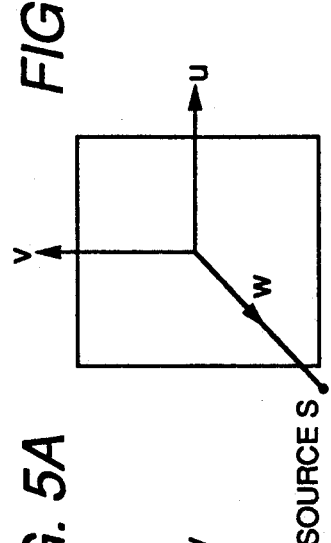
FIG. 5B depicts a normalized detector frame of reference and coordinate system.
Figure 5C:
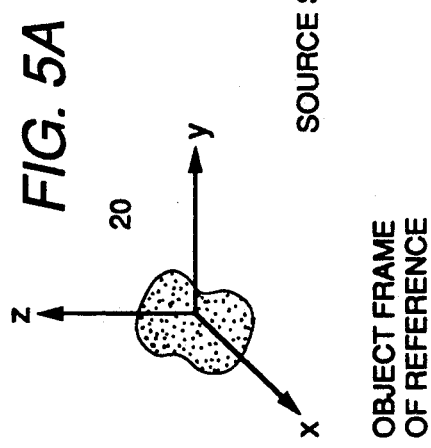
FIG. 5C depicts the manner in which the origins of the coordinate systems of FIGS. 5A and 5B coincide.

With reference to FIGS. 5A, 5B and 5C, we first define the frames of reference and their associated coordinate systems used in the analysis herein. (It should be noted that the frames of reference and coordinate systems in the detailed discussion hereinbelow differ from the generalized coordinate system depicted in the representative scanning configuration of FIG. 1). In particular, FIG. 5A depicts n object frame of reference which is fixed with respect to the object 20. Spatial location of any point in this frame of reference is expressed by the (x,y,z) triplet. The variables in Equations (2) and (3) are variable sin the object frame of reference. FIG. 5B depicts a normalize detector frame of reference which is fixed with respect to a normalized detector 50. Spatial locations in the normalized detector frame of reference are expressed by the (u,v,w) triplet. The origin of the (u,v,w) coordinate system is located at the center of the normalized detector 50, and the u and v axes lie on the normalized detector plane. The source position $S_i$ is always on the w axis, but its distance from the center of the normalized detector 50 may vary from one source position $S_i$ to another source position $S_j$.

As represented in FIG. 5C, we assume that the origin of the (x,y,z) coordinate system and the origin of the (u,v,w) coordinate system always coincide. In practice, this amounts to no more than scaling the actual detector 24 readings to the plane that passes through the origin of the (x,y,z) coordinate system and is orthogonal to the line connecting the source position $S_i$ and the origin.

Figure 6:
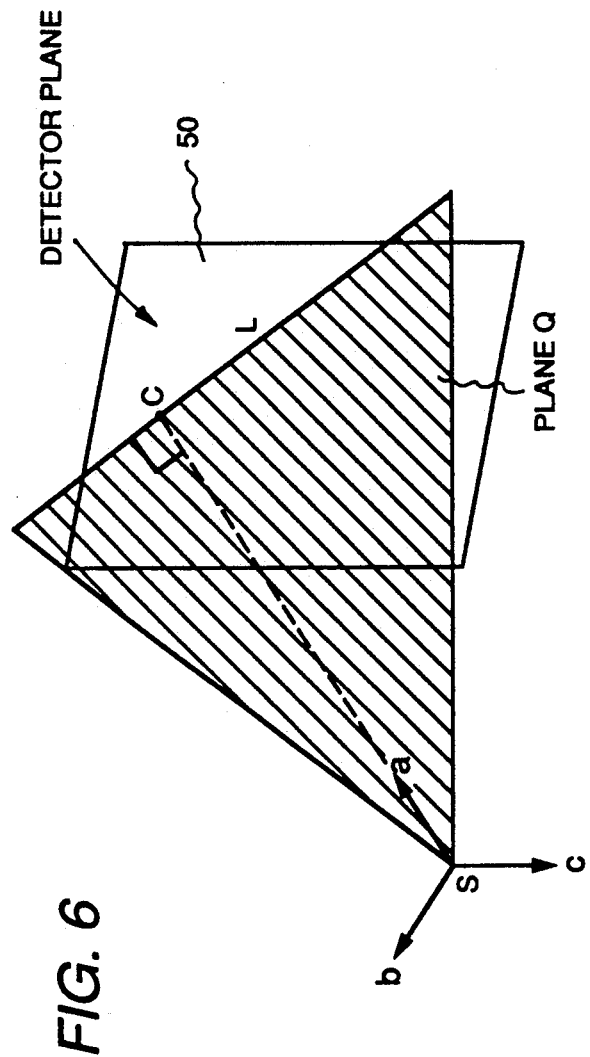
FIG. 6 depicts an integration plane, an integration frame of reference, and a corresponding coordinate system.

To facilitate the manipulation of planar integrals, we now introduce a third frame of reference. With reference to FIG. 6 Q is any plane containing the source S. Let Plane Q intersect the normalized detector plane at line L. Define a coordinate system (a,b,c) with source S as the origin such that a is a unit vector in plane Q orthogonal to line L, $\hat{b}$ is a unit vector in plane Q parallel to L, and $\hat{c}=\hat{b}\times\hat{a}$. We shall refer to the coordinate system (a,b,c) as the coordinate system in the integration frame of reference. To further facilitate integration on plane Q, we note that each point on plane Q is characterized by doublet (a,b) because the coordinate c is always zero. The doublet (a,b) can be converted to polar coordinates $(r,\theta)$ relative to the $\hat{a},\hat{b}$ axes by making the coordinate transformation: $(a,b,c) \to (r,\theta,c)$, where $$r = \sqrt{a^2 + b^2}$$

$$\theta = \tan^{-1}\frac{b}{a}$$

Figure 7:
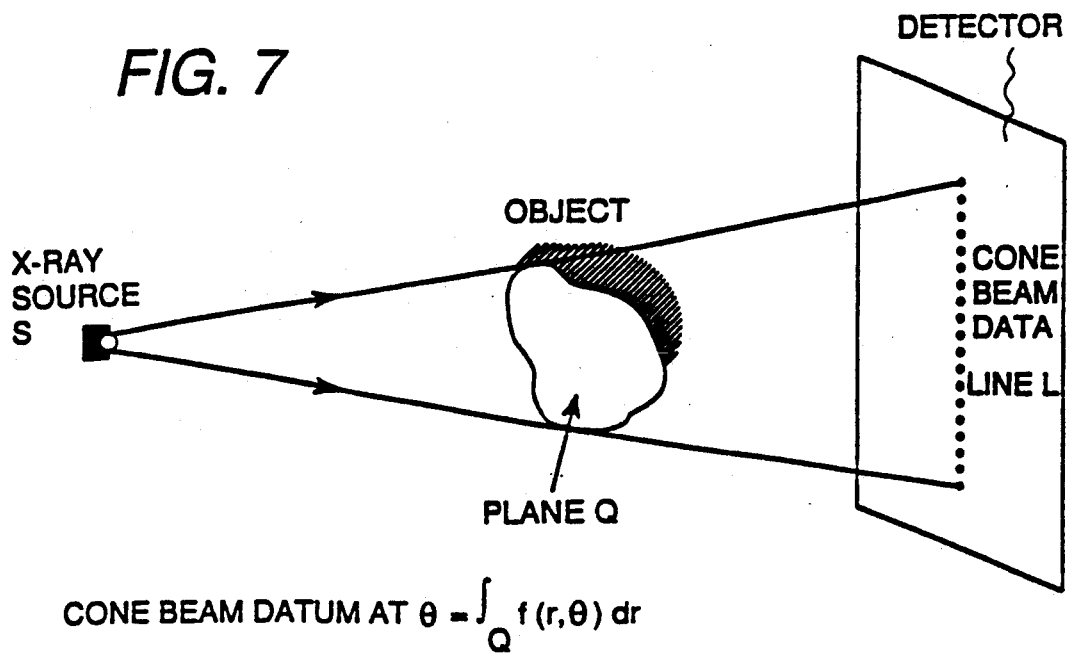
FIG. 7 depicts cone beam data corresponding to an integration plane though the object.

FIG. 7 illustrates a typical situation in cone beam scanning. Consider a plane Q, or slice, of the object as illustrated in FIG. 7. The cone beam source S projects plane Q on the normalized detector plane in the form of a straight line L. In the integration frame of reference, let the a axis intersect line L at point C (FIG. 6). By construction, SC is orthogonal to line L. Let $|SC|$ denote the distance between source S and the intersection point C. The datum X(t) on line L, where t represents the displacement from point C along L, is given by $$X(t) = \int\int f(r,\theta,0)\delta\left[\theta - \tan^{-1}\left(\frac{t}{|SC|}\right)\right]drd\theta$$

$$= \int f\left(r, \tan^{-1}\frac{t}{|SC|}, 0\right)dr$$

In other words, the datum X(t) represents the line integral of the object density along the line on plane Q making an angle $\theta=\tan^{-1}(t/|SC|)$ with the a axis. And noting that the variable t is proportional to $\tan\theta$, one would expect to obtain the integrated value of $f(r,\theta,0)$ over the r and the $\theta$ variables on plane Q, i.e., $\int\int f(r,\theta,0)drd\theta$, by integrating X(t) (with some suitable weighting), over the t variable on line L. To this end let us express the quantity $I=\int\int f(r,\theta,0)drd\theta$ in terms of the variable t. Now $$t = |SC|\tan\theta$$

$$dt = |SC|\sec^2\theta d\theta$$

Therefore the integral I is given by $$\begin{aligned}I &= \int\int f(r,\theta,0)drd\theta \quad (4)\\ &= \int \frac{|SC|^2}{|SC|^2 + (|SC|\tan\theta)^2}\sec^2\theta d\theta \int f(r,\theta,0)dr\\ &= |SC|\int \frac{dt}{|SC|^2 + t^2}\int f\left[r, \tan^{-1}\left(\frac{t}{|SC|}\right), 0\right]dr\\ &= |SC|\int \frac{X(t)dt}{|SC|^2 + t^2}\end{aligned}$$

Thus the quantity $I=\int\int f(r,\theta,0)drd\theta$ can be obtained by integrating the cone beam data X(t) on line L with weighting. In contrast the Radon data for this plane, $R(s,\hat{n})$, where, in the object frame of reference, s is the distance of plane Q from the origin and $\hat{n}$ is its normal, is given by $$R(s,\hat{n}) = \int\int f(r,\theta,0)rdrd\theta \quad (5)$$

Since $I \neq R(s,\hat{n})$, the Radon data cannot be obtained by integrating cone beam data along straight lines on the normalize detector plane. (However, if the data on the detector were generated by parallel beams of x-rays, integrating data along straight lines on the normalized plane detector would yield the Radon data.)

The only difference between the Radon data $R(s,\hat{n})$ and the integral I is the absence of the factor r is the integral of I. Since the density value $f(r,\theta,0)$ at each value of r is not known (otherwise there would be no need to do the cone beam scanning in the first place), the difference cannot be compensated for by weighting the data with r.

One way to introduce the factor r into the integrand is to note that in rotating plane Q about any axis on the plane through the origin, each point on the plane is translated by an amount proportional to $r\sin\gamma$, where r is the radial coordinate of the point, and $\gamma$ is its angular coordinate relative to the rotation axis. This observation prompts the following development with reference to FIGS. 8 and 9.

Figure 8:
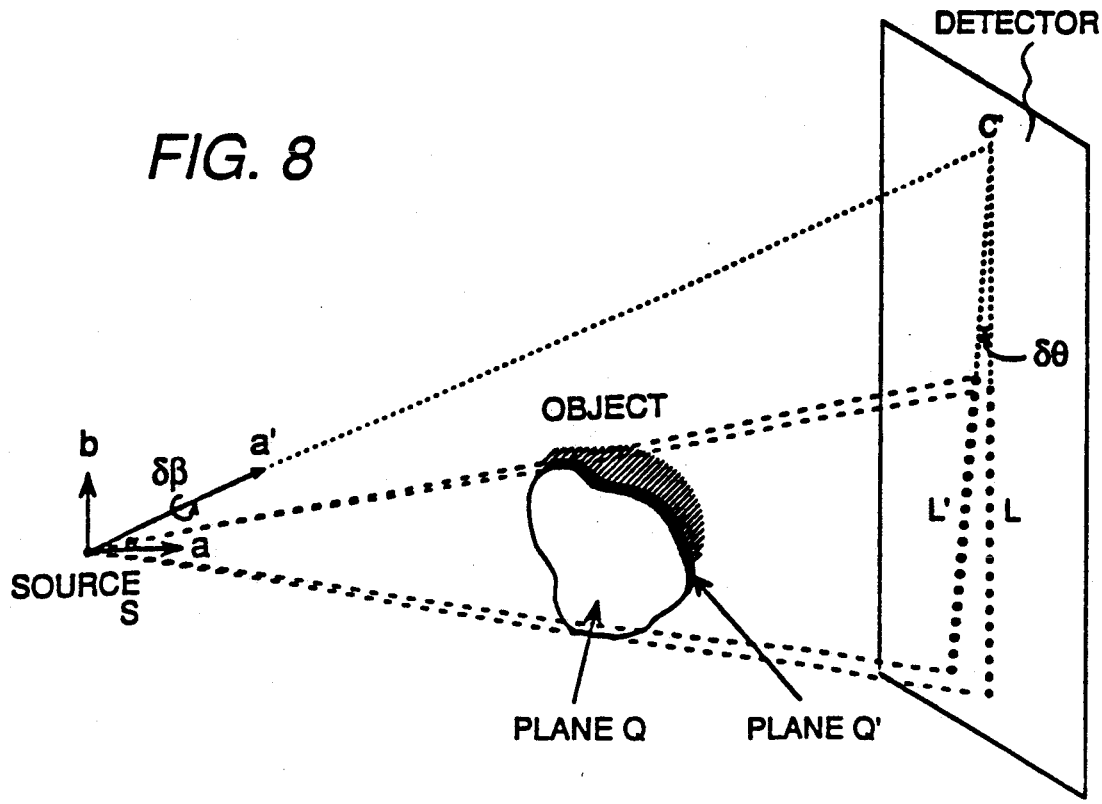
FIG. 8 similarly depicts cone beam data corresponding to a pair of closely spaced adjacent integration planes through the object.

Referring now to FIG. 8, let us consider another plane Q' in the object which is very close to plane Q of FIG. 7. Plane Q' is obtained by rotating plane Q itself by a small angle $\delta\beta$ about a rotation axis a' on plane Q passing through the source position S. Selection of the actual rotation angle $\delta\beta$ is a compromise between accuracy and signal-to-noise ration in each particular system. A smaller $\delta\beta$ results in greater accuracy, but at the expense of magnifying the noise in the data, and vice versa. Plane Q' projects another line L' on the normalized detector plane. Lines L and L' intersect at point C', where the rotation axis a' intersects the normal detector plane.

Let $\delta\theta$ be the angle between L and L'. (It will be apparent that the angles $\delta\theta$ and $\delta\beta$ are related to each other by straightforward geometry, and that $\delta\beta$ can be determined from $\delta\theta$. Examples of this calculation are provided hereinbelow for two particular cases.) Each point (r,$\theta$,0) on plane Q', in polar coordinates relative to the integration frame of reference, can be thought of as being obtained by translating by an amount $\delta\underline{r}$ from the corresponding point in plane Q. Denoting by $\alpha$ the angle between the rotation axis a' and the $\alpha$ axis, the amount of translation $\delta\underline{r}$ at point $\underline{r}=(r,\theta,0)$ is given by $$\begin{aligned}\delta\underline{r} &= \delta\beta\hat{a}' \times \underline{r} \\ &= \delta\beta(\cos\alpha\hat{a} + \sin\alpha\hat{b}) \times (r\cos\theta\hat{a} + r\sin\theta)\hat{b}) \\ &= r\sin(\theta - \alpha)\delta\beta\hat{c}\end{aligned}$$

The changes $\delta r$ in spatial coordinates r induce corresponding changes in the density values f(r), which in turn causes a change $\delta I$ in the value of the integral I, which is given by $$\begin{aligned}\delta I &= \int\int \nabla f(r, \theta, c)_{c=0} \cdot \delta\underline{r}\, rdrd\theta \\ &= \int\int \frac{\partial f(r, \theta, c)_{c=0}}{\partial c} r\sin(\theta - \alpha)\delta\beta drd\theta \\ &= \delta\beta \int\int \frac{\partial f(r, \theta, c)_{c=0}}{\partial c} \sin(\theta - \alpha)rdrd\theta \\ &= \delta\beta \frac{\partial}{\partial c} \int\int [f(r, \theta, c)_{c=0} \sin(\theta - \alpha)]rdrd\theta\end{aligned}$$

Thus $$\begin{aligned}\frac{dI}{d\beta} &= \frac{\partial}{\partial c} \int\int [f(r, \theta, c)_{c=0}\sin(\theta - \alpha)]rdrd\theta \\ &= \left.\frac{\partial T(c)}{\partial c}\right|_{c=0}\end{aligned}$$

where $$T(c)= \int\int [f(r,\theta,c)\sin(\theta-\alpha)]rdrd\theta$$

The quantity T(c) is almost the same as the Radon data in Equation (5) except for the extra factor $\sin(\theta-60)$. Now, however, the extra factor can be compensated for because it only involves the angular variable, whose value is available by measurement. This can be achieved by defining a new integral J which includes a weighting factor in the integrand of I to cancel out the extra factor, $$J = \int\int \frac{f(r, \theta, 0)drd\theta}{\sin(\theta - \alpha)} \qquad (6)$$

Figure 9:
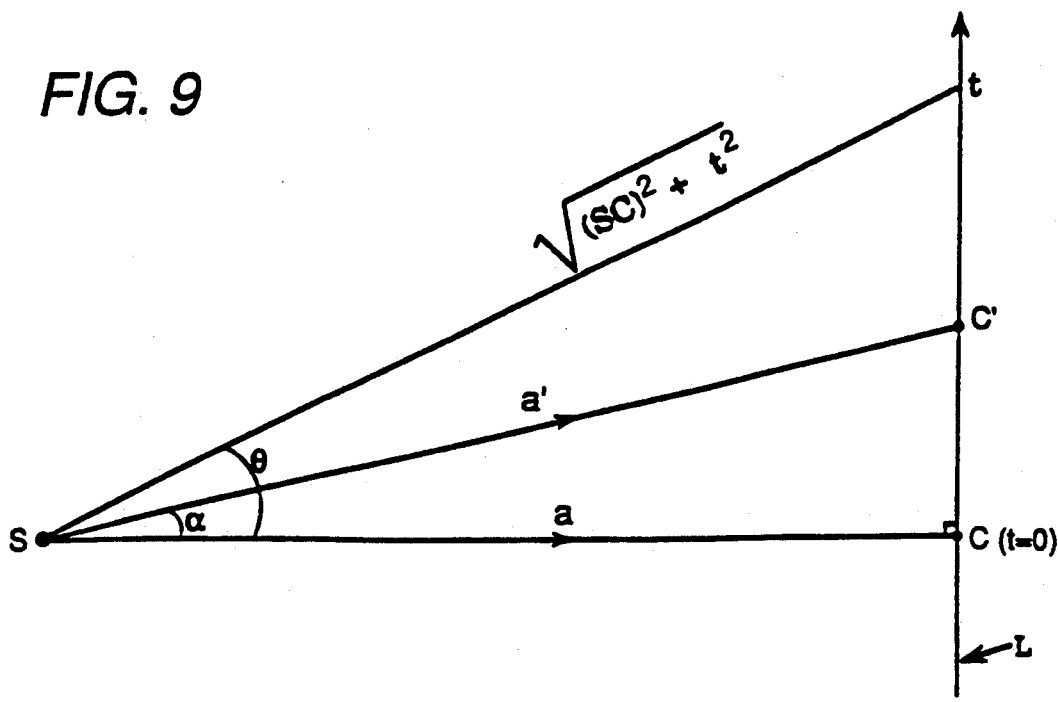
FIG. 9 shows geometry on an integration plane.

The geometry on plane Q is shown in FIG. 9. From FIG. 9 we get $$\sin\theta = \frac{t}{\sqrt{|SC|^2 + t^2}}$$

$$\cos\theta = \frac{|SC|}{\sqrt{|SC|^2 + t^2}}$$

$$\sin\alpha = \frac{\Delta C}{|SC'|}$$

$$\cos\alpha = \frac{|SC|}{|SC'|}$$

where $\Delta C$ denotes the displacement of C' and C. Hence we have $$\begin{aligned}\sin(\theta - \alpha) &= \sin\theta\cos\alpha - \cos\theta\sin\alpha \\ &= \frac{|SC|(t - \Delta C)}{|SC'|\sqrt{|SC|^2 + t^2}}\end{aligned}$$

Now we can express the desired integral J in the variable t incorporating the weighting factor $1/\sin(\theta-\alpha)$. Substituting Equations (4) and (7) into Equation (6) we have $$\begin{aligned}J &= \int\int \frac{f(r, \theta, 0)drd\theta}{\sin(\theta - \alpha)} \\ &= \int \frac{|SC'|\sqrt{|SC|^2 + t^2}\,|SC|X(t)}{|SC|(t - \Delta C)|SC|^2 + t^2} dt \\ &= \int \frac{|SC'|X(t)}{(t - \Delta C)\sqrt{|SC|^2 + t^2}} dt\end{aligned}$$

Going through the same mathematics as with integral I before, we obtain $$\begin{aligned}\frac{dJ}{d\beta} &= \frac{\partial}{\partial c} \int\int f(r, \theta, c)_{c=0}rdrd\theta \\ &= \frac{\partial R(s, \hat{c})}{\partial s}\end{aligned}$$

where, in the object frame of reference, is the distance between plane Q and the origin, and $$R(s,\hat{c})= \int\int f(\hat{r},\theta,0)rdrd\theta$$

is the planar integral of the function f on plane Q.

Figure 10:
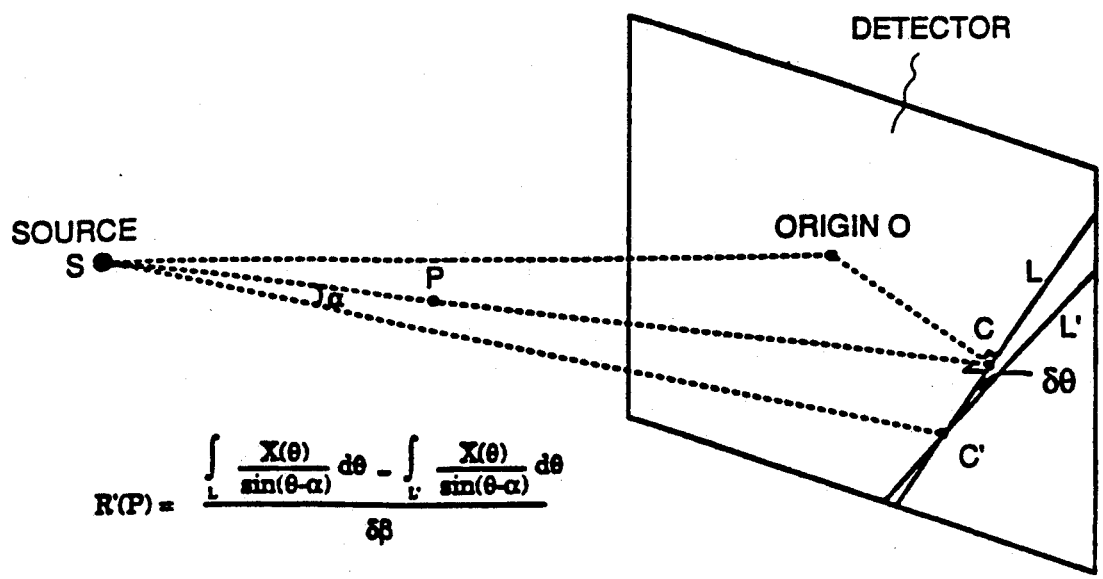
FIG. 10 illustrates a procedure in accordance with the invention for computing the radial derivative of Radon data from x-ray cone beam data.

Using Equation (9) we can in principle compute the radial derivative of the Radon data from eh cone beam data and the Radon data themselves can be obtained by integrating the result in the radial dimension. The procedure is illustrated in FIG. 10. To evaluate the radial derivative of the Radon data at a point $P=s\hat{n}$ where, in the object frame of reference, $s=|OP|$ and $\hat{n}=\underline{OP}/|OP|$, we do the following:

1. Determine the plane Q passing through the point P and orthogonal to line OP.
2. Determine the line L where plane Q intersects the normalized detector plane.
3. Locate the point C on L such that line SC is orthogonal to L.
4. Take any point C' on line L, defining a rotation axis a' as a line from S to C'. Equivalently rotate plane Q about the rotation axis a' through a small angle $\delta\beta$ resulting in plane Q', and rotate line L about point C' through a small angle $\delta\theta$ on the detector plane resulting in line L', the plane Q' intersecting the normalized detector plane at the line L'.
5. Compute the quantities J and J' on lines L and L', respectively, using Equation (8).
6. Compute the angle $\delta\beta$ from $\delta\theta$ by geometry.
7. The radial derivative of the Radon data at point P is obtained from the quantities J, J', and $\delta\beta$ using the following equation:

$$\frac{\partial R(s, \hat{n})}{\partial s} = \frac{J' - J}{\delta\beta}$$

Using the above procedure we can obtain the Radon data for all the planes through the object irradiated by the cone beam source. Incidentally, this is in agreement with the condition stated in Smith (1989, above) that, in order to have complete data in cone beam scanning every plane through the object should intersect a source position.

Figure 11:
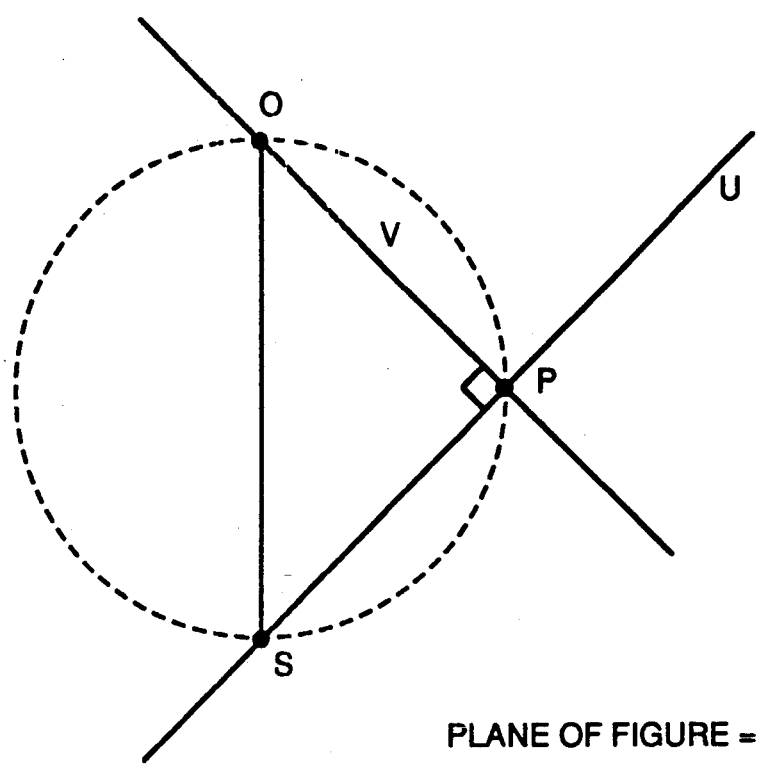
FIG. 11 illustrates the Radon data on a plane that can be computed from one x-ray source position.
Figure 12:
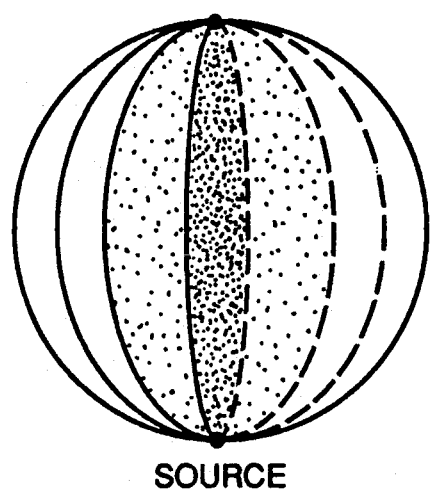
FIG. 12 depicts a spherical shell or Radon shell representing all the Radon data that can be computed from one source position.
Figure 13:
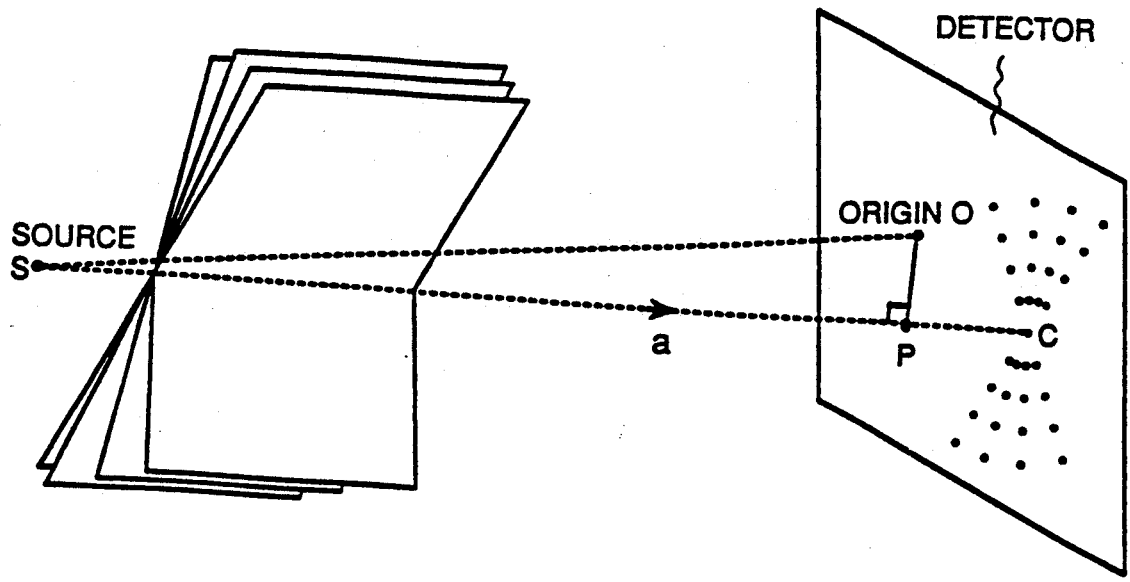
FIG. 13 depicts an operation termed rotation about the a axis, as an example of Case 1.

With reference now to FIGS. 11, 12 and 13, the range of the Radon data (i.e., planar integrals) that can be generated at one source position in this way can be estimated quantitatively. Let the plane of FIG. 11 be any plane containing the cone beam source S and the origin O; call this plane W. Consider any plane Q orthogonal to plane W and containing the source S. Let U be the lie where plane Q intersects plane W; that is, plane Q passes through line U and is orthogonal to plane W, the plane of FIG. 11. Let V be the line on plane W passing through the origin and orthogonal to line U, and let lines U and V intersect at point P. Let v be the unit vector along line V. As shown below in Appendix A with reference to FIG. 21, the vector $|OP|\hat{v}$ is orthogonal to plane Q, and therefore the planar integral over Q is the Radon datum $R(|OP|,\hat{v})$ in the object frame of reference, i.e., a Radon datum at point P. Since the angle OPS is a right angle, point P lies on the circle on plane W with OS as diameter. By applying the same operation to all the planes orthogonal to plane W and passing through source S, Radon data are generated on the entire circle, as illustrated in FIG. 11.

As represented in FIG. 12, by repeating the entire operation performed on plane W on all the other panes containing the line segment OS, Radon data are generated on all the circles containing OS as diameter. In other words, Radon data are generated on a spherical shell with OS as diameter. This spherical shell may also be referred to as the Radon shell.

Two particular cases will now be considered in detail, distinguished by the orientation of the rotation axis about which the FIG. 6 integration plane Q is rotated. As described hereinabove, each of the many rotation axes passes through the source position S, the line SO passing through the source position S and the origin O is orthogonal to the normalized detector plane, and the normalized detector plane contains the origin.

Case 1 applies when the rotation axis is not coincident with the b axis, and includes the specific case where the rotation axis is coincident with the a axis. Thus Case 1 may be described as extended rotation about the a axis. In the particular embodiments described herein where Radon data are being generated on a set of coaxial planes $\phi_j$ each containing a vertical or reference axis, as depicted in FIG. 4, Case 1 applies for all source positions $S_i$ not on the vertical or reference axis.

Case 2 applies when the rotation axis is coincident with the b axis of FIG. 6. In this case, the rotation axis is parallel to the normalized detector plane. In the particular embodiments described herein where Radon data are being generated on a set of coaxial plane $s\phi_j$ each containing a vertical or reference axis as depicted in FIG. 4, Case 2 applies for all source piston $S_i$ which are on the vertical or reference axis.

A specific Case 1 case will into be considered, where the rotation axis is coincident with the a axis. In this case $\alpha=0$ in FIG. 10, and the two lines L and L' intersect at point C where the a axis intersects the detector plane. If lines are drawn on the normalized detector plane at all orientations passing through point C, (FIG. 13), they are the projections on the normalized detector plane of integration planes at different orientations containing line SC as the common axis. Label these integration planes $Q_1, Q_2, Q_3, \ldots$, etc. Then according to Equation (9) the quantity $dJ/d\beta$, with the weighting function $\sin\theta$ in J computed for each pair of adjacent lines closely spaced on the detector plane, yields the derivative of the planar integral on plane $Q_i$ which projects onto the pair of adjacent lines.

Figure 14:
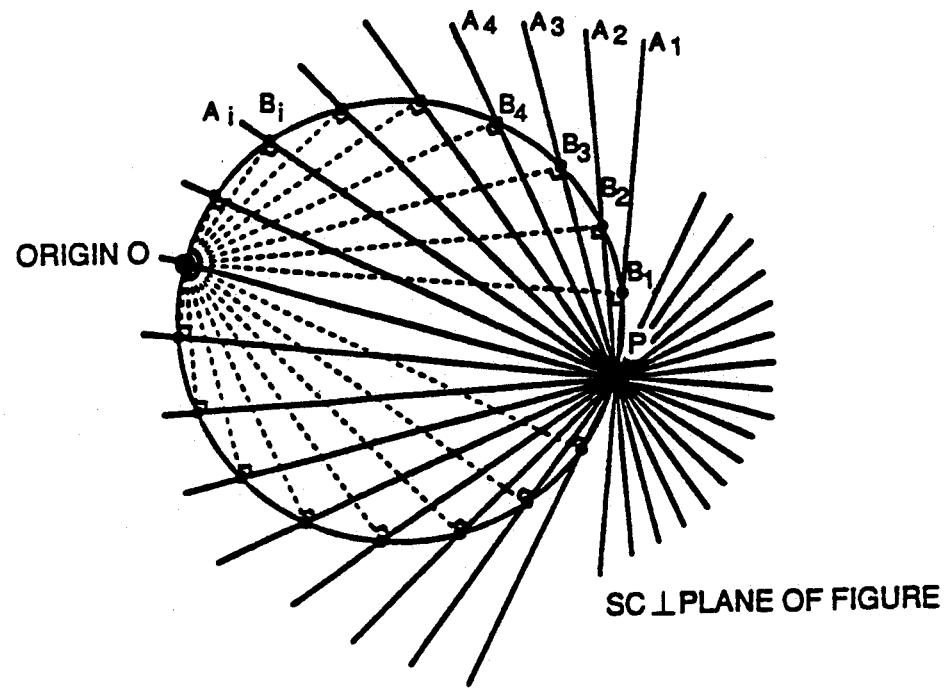
FIG. 14 depicts the Radon data that are generated by rotation about the a axis.

This situation is illustrated in FIG. 14, which depicts the vie in direction SC, i.e., from the source toward the intersection point C on the detector. The plane of fIG. 14 contains the origin O, and line SC is orthogonal to FIG. 14. Point P is the intersection point between the plane of FIG. 14 and line SC. Because line SC is orthogonal to the plane of FIG. 14, all the planes $Q_i$ that contain line SC appear as lines forming the polar grid with point P as center; the lines are labeled $A_1, A_2, A_3, \ldots$, etc. in FIG. 14, corresponding to planes $Q_1, Q_2, Q_3, \ldots$, etc., respectively. From the origin O drop orthogonal lines to each of these lines, and let each pair of orthogonal lines intersect at locations $B_1, B_2, B_3, \ldots$, as illustrated. Again, as shown in Appendix A, the lines from the origin orthogonal to lines $A_1, A_2, A_3, \ldots$, are also orthogonal to planes $Q_1, Q_2, Q_3, \ldots$, etc. Therefore the planar integrals on planes $Q_1, Q_2, Q_3, \ldots$, etc. comprise the Radon data on points $B_1, B_2, B_3, \ldots$, etc. And, because each $B_i$ is at the intersection of two orthogonal lines, one from origin O and one from P, all points $B_i$ fall on the circle with line segment OP as diameter.

Since the points $B_i$ all lie on the plane of FIG. 14, the plane of the circle on which they fall is orthogonal to line SC. Furthermore, because line segment OP is orthogonal to line segment SP, point P lies on the surface of the sphere with OS as diameter. Thus P is the point where lie segment SC intersects the Radon shell.

The operations indicated in FIG. 13 may be summarized:
(1) construct lines on the normal detector plane at all orientations passing through a point C,
(2) compute the quantity J with the weighting function $\sin\theta$ on each of the lines, and
(3) compute the derivative $dJ/d\beta$.

As a result, Radon data generated on a circle (FIG. 14) on the plane containing the origin O and orthogonal to line SC, with line segment OP as a diameter of the circle where P is the point where line SC intersects the Radon shell. This entire operation is referred to herein as the rotation operational at point C on the detector plane.

Figure 15:
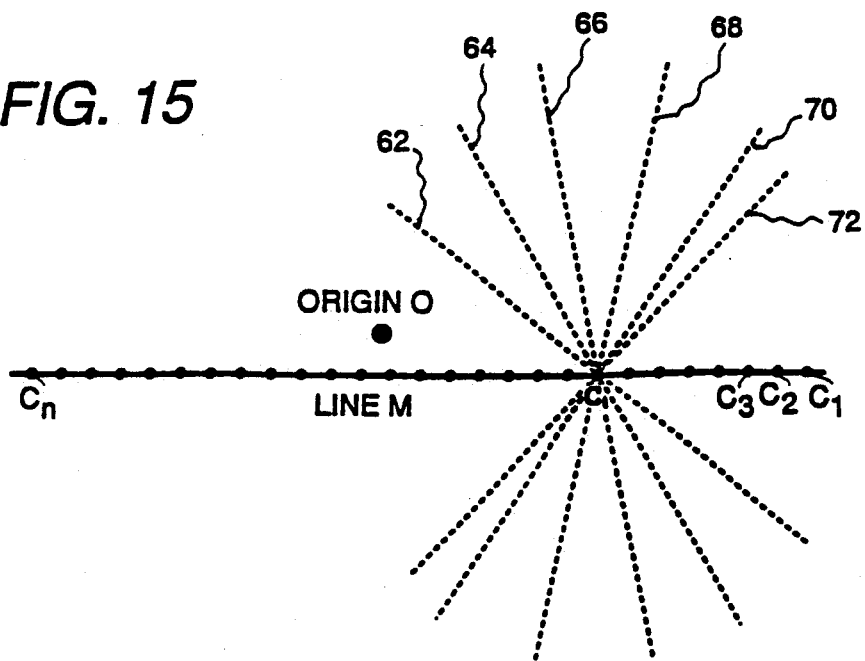
FIG. 15 illustrates the generation of Radon data by performing the rotation operation on every point on a line projected onto the normalized detector plane.

FIG. 15 represents the normalized detector plane for a particular source position. The rotation axis intersects the normalized detector plane at point $C_i$, and lines 62, 64, 66, 68, 70 and 72 are representative intersections of various integration plane Q with the normalized detector plane. To illustrate the rotation operation in the context of FIG. 15, take any line M on the normalized detector plane and perform the rotation operation on each point $C_j$ on the line. For each point $C_j$ a circle $D_j$ of Radon data is generated, where the plane of the circle is orthogonal to line $SC_j$ and the diameter of the circle is line segment $OP_j$ where $P_j$ is the point where line $SC_j$ intersects the Radon shell. Since all the points $C_j$ line on line M, all points $P_j$ lie on circle G where the plane containing source S and line M intersects the Radon shell. Also, because the plane of each circle $D_j$ is orthogonal to the corresponding line $SP_j$ which lies on the plane of circle G, the plane of circle $D_j$ is orthogonal to the plane of the G.

To summarize, if rotation operations are performed on all the points on line M on the normalized detector, Radon data on a series of circles $D_j$ are generated. The plane of circle Dj is orthogonal to the plane of circle G where the plane containing source s and line M intersects the Radon shell, and the diameter of $D_j$ is line segment $OP_j$, where $P_j$ is a point on circle G. If points $C_j$ are sufficiently finely sampled on line M, the se of Radon circles $D_j$ generated is sufficiently close to cover the entire Radon shell. In other words, the data on the entire Radon shell can be generated by performing rotation operations on a line on the detector plane.

The weighting function $\sin\theta$ used in computing the function J in this case is singular at $\theta=0$. The singularity can be removed by the process of regularization, which has been successfully employed in the filtering portion of filtered back projection in conventional x-ray CT where the kernel also contains singularity.

Case 2 will now be considered where the rotation axis is coincident with h b axis in F(GI. 6. In this case $\alpha=\pi/2$ in FIG. 10, and the two lines L and L' are parallel to each other since the rotation axis is parallel to the normalized detector plane.

Figure 16:
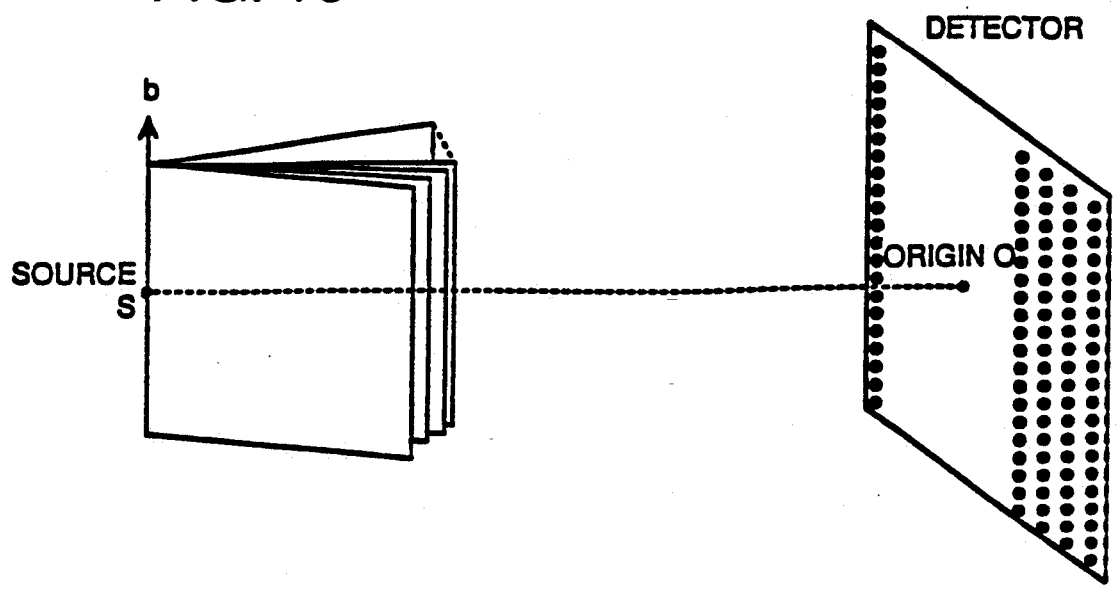
FIG. 16 depicts the rotation operation about the b axis, as an example of Case 2.

Referring to FIG. 16, if all the locations along the line through OC, which is orthogonal to L (Appendix B), lines are drawn parallel to L and L', they are the projections on the detector plane of planes at different orientations containing the b axis as a common axis. Label these planes $Q_1, Q_2, Q_3, \ldots$, etc. Then according to Equation (9) the quantity $dJ/d\beta$, with the weighting function $\cos\theta$ in J computed for each pair of adjacent lines closely spaced on the normalized detector plane, yields the derivative of the planar integral on the plane $Q_j$ which projects onto the pair of adjacent lines.

Figure 17B:
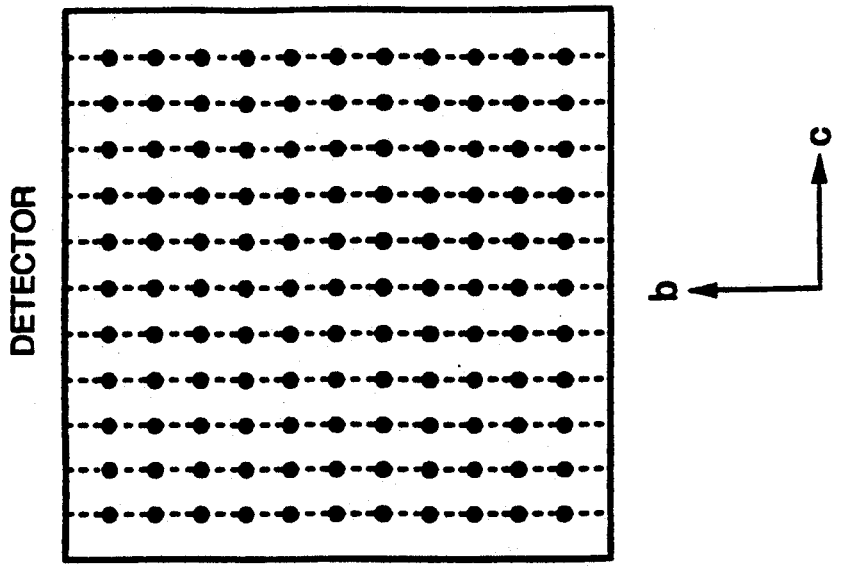
FIG. 17B depicts data points and lines on the normalized detector plane resulting from rotation about the b axis.
Figure 17A:
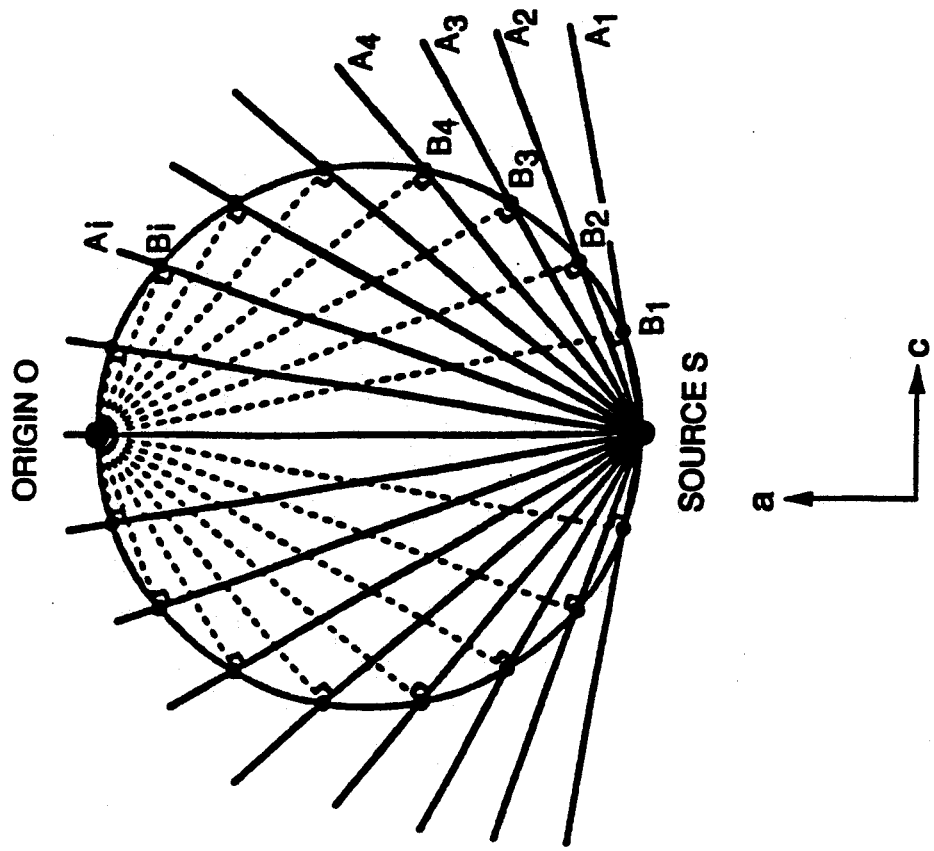
FIG. 17A depicts the Radon data that are generated by rotation about the b axis.

This situation is illustrated in FIG. 17A, which depicts the view in the direction of the b axis, and in FIG. 17B which depicts data pints and lines on the normalized detector plane for Case 2. The plane of FIG. 1A is the c-a plane containing the source; in Appendix B it is shown that the origin O also lies on this plane. Since the b axis is orthogonal to the plane of FIG. 17A, all planes $Q_j$ that contain the b axis as a common axis appear as the lines forming the polar grid wit the source S as center; the lines are labeled as $A_1, A_2, A_3, \ldots$, etc. in FIG. 17A, corresponding to planes $Q_1, Q_2, Q_3, \ldots$, etc., respectively. From the origin drop orthogonal lines to each of these lines, and let each pair of orthogonal lines intersect at location $B_1, B_2, B_3, \ldots$, as illustrated. Again, as shown in Appendix A, the lines from the origin orthogonal to the lines in the polar grid, $A_1, A_2, A_3, \ldots$, are also orthogonal to planes $Q_1, Q_2, Q_3, \ldots$, etc. Therefore, the planar integrals on $Q_1, Q_2, Q_3, \ldots$, constitute the Radon data on points $B_1, B_2, B_3, \ldots$, etc. And, because each $B_j$ is at the intersection of two orthogonal lines, one from origin O and one from source S, these points fall on the circle with line segments OS as diameter.

Since points $B_j$ all lie on the plane of FIG. 7A, the plane of the circle of Radon data is orthogonal to the b axis, which is normal to the plane. Now, as shown in FIG. 17B, and the b axis is parallel to the set of parallel lines on the detector plane including L and L', and the plane of the circle is orthogonal to the set of parallel lines.

The operations indicated in FIG. 16 may be summarized:

(1) construct lines parallel to direction $\theta$ on the detector plane at all locations covering the entire plane,
(2) compute the quantity J with the weighting function $\cos\theta$ on these lines, and
(3) compute the derivative $dj/d\beta$.

As a result, Radon data ar generated on a circle (FIG. 17A) on the plane containing origin O and source S, and orthogonal to the set of parallel lines on the detector plane, with line segments OS as a diameter of the circle. This entire operation is referred to herein as the translation operation at angle $\theta$.

To generate Radon data to the entire Radon shell, translation operations are performed at all angles on the normalized detector plane. For each angle $\theta_j$ a circle $D_j$ of Radon data is generated, where the plane of the circle is orthogonal to the lines at angle $\theta_j$ on the detector plane and contains origin O and source S, and the diameter of the circle is line segment OS. If the angles are sufficiently finely sampled, the set of Radon circles generated are sufficiently close to cover the entire Radon shell.

Finally we can tackle the ask we set out to resolve: generating Radon data on the set of coaxial vertical planes $\theta_j$ of FIG. 4 from the cone beam data.

In general, the procedure involves nested steps, designated hereinbelow by subscripts i, j and k. Subscript i corresponds to the various source positions $S_i$. Thus, the subsequent steps are repeated for each of the source posi- tions $S_i$. Subscript j corresponds to the set of planes $\theta_j$, which may be an arbitrary set of planes, in Radon Space on which it is desired to generate planar integrals. For each of the source positions $S_i$ a corresponding Radon shell is defined on which Radon data can be determined, and intersections of the planes $\theta_j$ with the Radon shell define a set of circles $D_{ij}$ on the Radon shell. For each particular source position $S_i$ the subscript i remains fixed, while the subscript j varies to designate each circle of the set of circles $D_{ij}$.

Then, for each of the circles $D_{ij}$, each of the further subsequent steps is repeated. Specifically, a rotation axis is defined as a line through the particular source positions $S_i$, intersecting the particular circle $D_{ij}$, and perpendicular tot he plane of the circle $D_{ij}$ (and perpendicular to the corresponding plane $\theta_j$). On each of the rotation axes a set of integration planes $Q_{ijk}$ is defined, the integration planes $Q_{ijk}$ being coaxial with the particular rotation axis and intersection of the particular circle $D_{ij}$ to define the location of a Radon datum point $R_{ijk}$ for that particular integration plane $Q_{ijk}$. For each particular source position $S_i$ and circle $D_{ij}$ the subscripts i and j remain fixed, while the subscript k varies to designate each integration plane $Q_{ijk}$. It will be appreciated that the overall procedure of nested steps involves a multiplicity of individual integration planes $Q_{ijk}$, each corresponding to an individual Radon datum point $R_{ijk}$.

Continuing with the general procedure, each of the multiplicity of integration planes $Q_{ijk}$ intersects the normalized detector plane (the orientation of which corresponds to the particular source position $S_i$) on respective lines $L_{ijk}$. Then, for each of the lines $L_{ijk}$ on the normalized detector plane, the corresponding integration plane $Q_{ijk}$ is rotated about the rotation axis by a small rotation angle to define a plane $Q_{ijk}'$ intersecting the normalized detector plane on a corresponding line $L_{ijk}'$. Equivalently, the line $L_{ijk}$ is rotated about a point on the line (Case 1) or translated to a parallel line (Case 2), depending on the particular source position $S_i$, to define the line $L_{ijk}'$ and the corresponding integration plane $Q_{ijk}'$.

Finally, to determine the radial derivative of the Radon datum at the particular point $R_{ijk}$, weighted line integrals $J_{ijk}$ and $J_{ijk}'$ are determined by integrating respectively along the lines $L_{ijk}$ and $L_{ijk}'$, and the difference between the weighted line integrals is divided by the rotation angle $\delta\beta$.

Figure 18C:
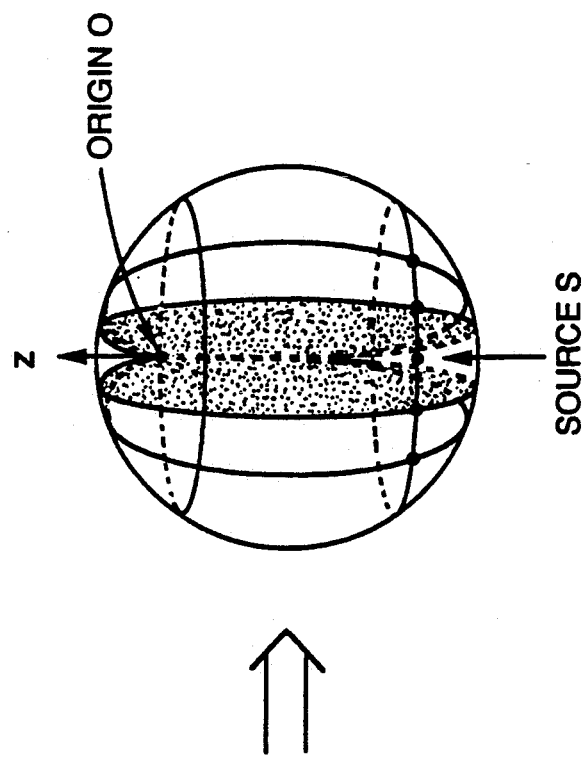
FIG. 18C depicts the intersection of the FIG. 18A coaxial vertical planes with the Radon shell of FIG. 18B.
Figure 18A:
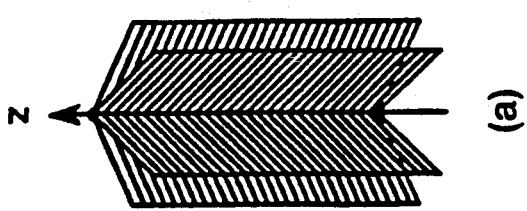
FIG. 18A, line
Figure 18B:
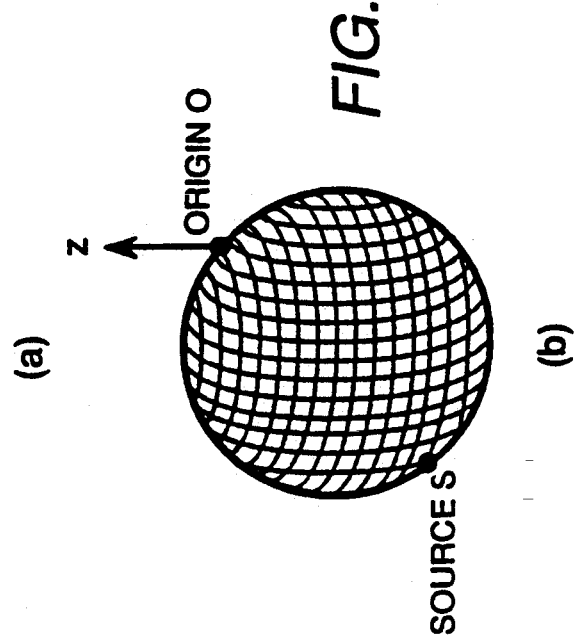
FIG. 18B depicts the Radon shell generated for a particular x-ray cone beam source position.

Considering now the specific situation where it is desired to generate planar integrals on a set of coaxial vertical planes as input to the Radon inversion procedure of the above-incorporated application Ser. No. 631,818 [RD-19564], FIG. 18A, like FIG. 4, illustrates the set of coaxial vertical planes $\phi_j$ containing the z axis as the common axis, where the vertical axis is taken to be the z axis in the object frame of reference. FIG. 18B shows a general cone beam scanning situation, with the source S, the origin O, and the Radon shell generated at the source position. Since the source position S is not on the Z axis, FIG. 18B is an example of Case 1 as defined hereinabove. FIG. 18C illustrates the geometry, showing intersections of the FIG. 18A planes $\phi_j$ with the FIG. 18B Radon shell for a particular source position $S_i$. It can be seen that these intersections define circles on the Radon shell of points on the individual planes $\phi_j$.

Figure 19:
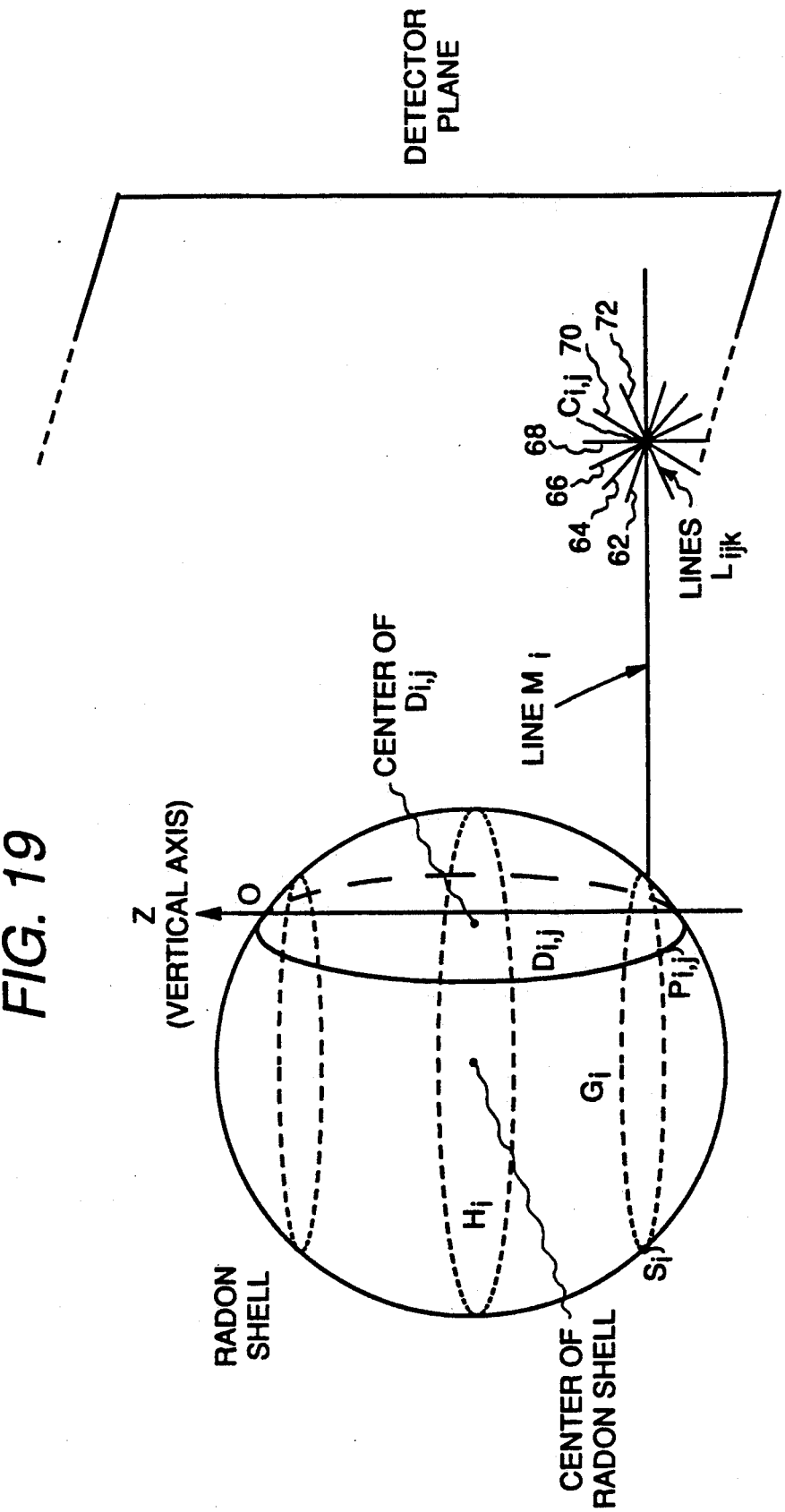
FIG. 19 represents in detail one of many circles where the vertical planes intersect the Radon shell as in FIG. 18C, and illustrates the Case 1 procedure for generating Radon data on the vertical planes from detector data.

FIG. 19 illustrates in particular how to generate Radon data on the vertical planes $\phi_j$ in the Case 1 situation of FIG. 18C, where cone beam data is acquired at each of a plurality of source positions $S_i$, each source position $S_i$ resulting in a corresponding spherical shell or Radon shell, such as the Radon shell of FIGS. 18B, 18C and 19. Also, for each source position $S_i$, a corresponding circle $G_i$ is defined on the corresponding Radon shell in a plane containing the source position $S_i$ and perpendicular to the plane $\phi_j$, i.e., a horizontal plane orthogonal to the vertical axis.

It can be shown that, for each source position $S_i$, each of the vertical planes $\phi_j$ intersects the Radon shell corresponding to the particular source position $S_i$ in a circle which may be designated circle $D_{ij}$. The circles $D_{ij}$ intersect the circle $G_i$ at points $P_{ij}$ corresponding to the circles $D_{ij}$. (Stated alternatively, the planes $\phi_j$ intersect the circle $G_i$ at points $P_{ij}$ corresponding to the particular source position $S_i$ and plane $\phi_j$.) The circles $D_{ij}$ pass through the origin O, with lines from O to $P_{ij}$ as diameters. In particular, $G_i$ = The circle where the horizontal plane passing through source position $S_i$ intersects the Radon shell $D_{ij}$ = The circle where the vertical plane $\phi_j$ containing the z axis intersects the Radon shell $H_i$ = The horizontal equatorial plane through the center of the Radon shell Since origin O is on both vertical plane $\phi_j$ and the Radon shell, it is on intersection circle $D_{ij}$. By symmetry, horizontal equatorial plane $H_i$ through the center of the Radon shell must bisect circle $D_{ij}$, which is on a vertical plane $\phi_j$. Therefore, the center of $D_{ij}$ lies on horizontal equatorial plane $H_i$. Let $OP_{ij}$ be a diameter of circle $D_{ij}$. The distance between point $P_{ij}$ and horizontal equatorial plane $H_i$ is the same as that between origin O and $H_i$. It follows that point $P_{ij}$ lies on circle $G_i$, because the distance between the horizontal plane containing $G_i$ and plane $H_i$ is the same as that between origin O and plane $H_i$.

Because it is desired to generate planar integrals on each vertical plane $\phi_j$, and because, for each source position $S_i$, only those planar integrals on the corresponding Radon shell can be generated, for each source position $S_i$ the planar integrals on each of the circles $D_{ij}$ for the particular source position $S_i$, $S_i$ projects $G_i$ onto the normalized detector plane as a corresponding line $M_i$. The intersection points $P_{ij}$ project to corresponding points $C_{ij}$ on the line $M_i$.

Then, the rotation operation is performed on each of the points $C_{ij}$ on the line $M_i$. The rotation operation on each point $C_{ij}$ results in the generation of Radon data on the entire circle $D_{ij}$ corresponding to the particular point $C_{ij}$. Thus, each circle $D_{ij}$ in FIG. 19 is represented by the FIG. 14 circle having diameter OP, with point P in FIG. 14 representing each of the intersection points $P_{ij}$ in FIG. 19. The rotation axis for each of the points $C_{ij}$ is a line through the particular source position $S_i$, the corresponding point $P_{ij}$ and the point $C_{ij}$. When the rotation operation is performed for all points $C_{ij}$ on a particular line $M_i$ corresponding to a particular source position $S_i$, Radon data on the entire Radon shell for the particular source position $S_i$ are generated, organized as the circles $D_{ij}$ on the planes $\phi_j$. When the operations are repeated for each source position $S_i$, Radon data is filled in on all the desired vertical planes.

Summarizing the rotation operation for each projected point $C_{ij}$ in FIG. 19, lines $L_{ijk}$ are constructed on the normalized detector plane at a plurality of orientations passing through the projected point $C_{ij}$. These lines $L_{ijk}$ are intersections on the normalized detector plane of corresponding integration planes $Q_{ijk}$, as are represented in FIGS. 13 and 14. Each of the integration planes contains a rotation axis along a line passing through the particular source position $S_i$, the particular point $P_{ij}$, and the particular projected point $C_{ij}$. A multiplicity of figures like FIG. 14 can be drawn, the plane of each figure orthogonal to a particular rotation axis.

Each of the lines $L_{ijk}$ is rotated on the normalized detector plane about the project point by a small angle $\delta\theta$ to define a line $L_{ijk}'$ which is the intersection of a plane $Q_{ijk}'$ containing the particular rotation axis with the normalized detector plane. From the angle $\delta\theta$, the rotation angle $\delta\beta$ between the planes $Q_{ijk}$ and $Q_{ijk}'$ is determined by geometry. Then respective weighted line integrals $J_{ijk}$ and $J_{ijk}'$ are determined by integrating along the lines $L_{ijk}$ and $L_{ijk}'$ in the manner described hereinabove. Finally, the difference between the weighted line integrals $J_{ijk}$ and $J_{ijk}'$ is divided by the rotation angle $\delta\beta$ to yield the radial derivative of the Radon datum at a point on the circle $D_{ij}$ where the plane $Q_{ijk}$ intersects the circle $D_{ij}$.

The determination of the rotation angle $\delta\beta$ between the two integration planes, given the angle $\delta\theta$ between the two detector lines can be accomplished by a number of geometric procedures. The following is a geometrically-derived formula for the Case 1 situation:

$$\delta\beta = \cos\phi_j \cos\eta \frac{1 + \tan^2\theta}{1 + \cos^2\phi_j \cos^2\eta \tan^2\theta} \delta\theta$$

where $\phi_j$ = azimuthal angle of plane $\phi_j$ with respect to SO

η = polar angle of SO

θ = angle between the line $L_{ijk}$ and the reference line where the plane $\phi_j$ intersects the normalized detector plane The above Case 1 procedure cannot be applied when the source position $S_1$ is on the z axis either directly above or directly below the origin O, which are Case 2 situations as defined hereinabove.

Figure 20:
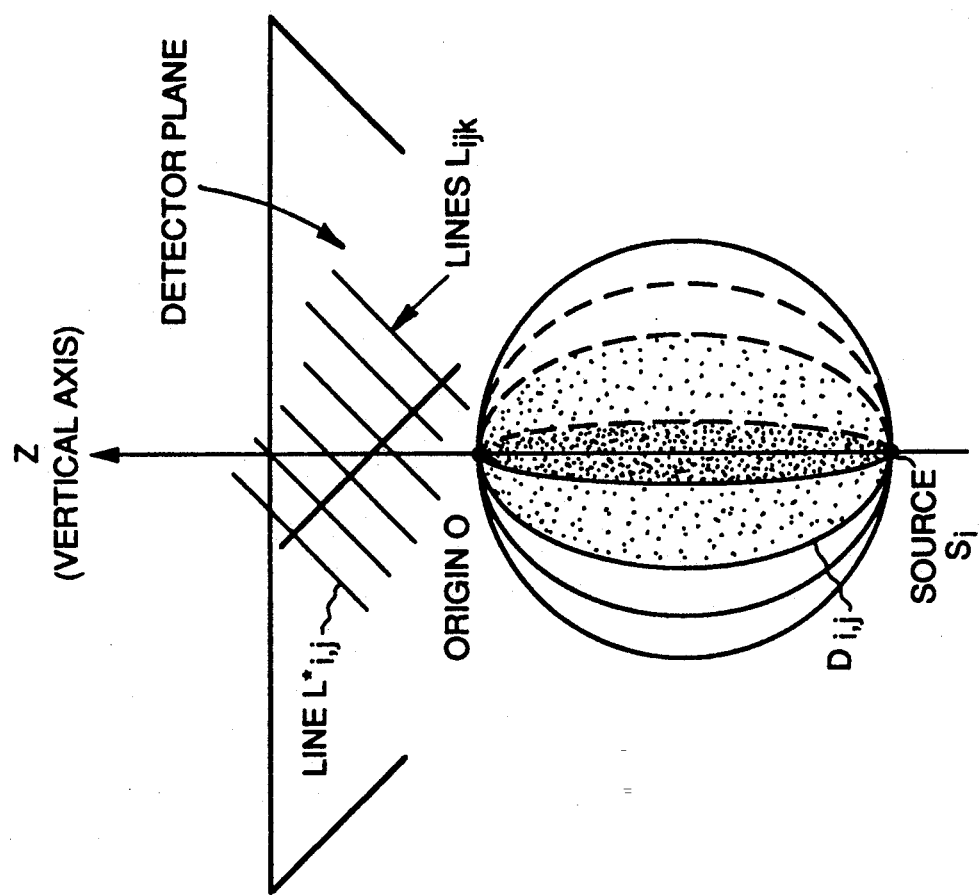
FIG. 20 represents the circles where the vertical planes intersect the Radon shell when the source position S is on the axis of the vertical planes, and illustrates the Case 2 procedure for generating Radon data from the detector data.

Referring in particular to FIG. 20, illustrated is a situation where the source position $S_i$ is directly below the origin O. This situation is also represented in FIGS. 16, 17A and 17B, where each axis of rotation passes through the source position $S_i$ parallel to the plane of the normalized detector. In FIG. 20, each of the vertical planes $\phi_j$ with the z axis as the common or reference axis intersects the Radon shell in a great circle $D_i$, with $OS_i$ as the diameter. Each circle $D_{ij}$ has a corresponding axis of rotation for the integration planes which is perpendicular to the circle $D_{ij}$ and its corresponding plane $\phi_j$.

For Case 2, each particular circle $D_{ij}$ is projected from the source position Si to a line $L_{ij}^*$ on the normalized detector plane. Because circle $D_{ij}$ contains O and $S_i$, line $L_{ij}^*$ is also the projection of the plane $\phi_j$ onto the normalized detector plane.

To generate Radon data on the circle $D_{ij}$, parallel lines $L_{ijk}$ are constructed on the normalized detector plane perpendicular to the line $L_{ij}^*$. The lines $L_{ijk}$ are represented by the parallel lines on the normalized detector plane in FIGS. 16 and 17B, and are the intersections on the detector plane of corresponding integration planes $Q_{ijk}$, each containing a rotation axis along a line passing through the particular source position $S_i$ and orthogonal to the plane of the particular circle $D_{ij}$.

Each of the parallel lines $L_{ijk}$ is translated by a small distance to define a line $L_{ijk}'$ which is the intersection of a plane $Q_{ijk}'$ containing the particular rotation axis with the normalized detector plane. The rotation angle $\delta\beta$ between the two planes $Q_{ijk}$ and $Q_{ijk}^*$ is determined by geometry from the distance between the lines $L_{ijk}$ and $L_{ijk}'$. Then respective weighted line integrals $J_{ijk}$ and $J_{ijk}'$ are determined by integrating along the lines $L_{ijk}$ and $L_{ijk}'$ in the manner described hereinabove. Finally, the difference between the weighted line integrals $J_{ijk}$ and $J_{ijk}'$ is divided by the rotation angle $\delta\beta$ to yield the radial derivative of the Radon datum at a point on the circle $D_{ij}$ where the plane $Q_{ijk}$ intersects the circle $D_{ij}$.

The determination of the rotation angle $\delta\beta$ between the two integration planes can be accomplished by the following geometrically-drived formula for the Case 2 situation:

$$\delta\beta = \frac{|SO|\delta y}{|SO|^2 + y^2}$$

where

|SO| = distance between S and O y = distance of the line $L_{ijk}$ from O

δy = translation distance

Considering the number of computations required in embodiments of the invention, at each view angle the generation of the datum at one point in the Radon space requires computations on a line of data on the detector plane, which contains $\approx N$ data points. Therefore, to generate the data on a circle on the Radon shell requires $\approx N \times N = N^2$ computations. The number of computations required to generate data on N circles covering the Radon shell is therefore equal to $\approx N \times N^2 = N^3$.

Finally, the total amount of computation at all N view angles is given by $N^3 \times N = N^4$.

A faster way to arrive at the same estimate is the following: To generate the datum at one point in the Radon space requires N computations. Because there are $\approx N^3$ points in the Radon space, the total amount of computations is equal to $\approx N^3 \times N = N^4$.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

APPENDIX A

Figure 21:
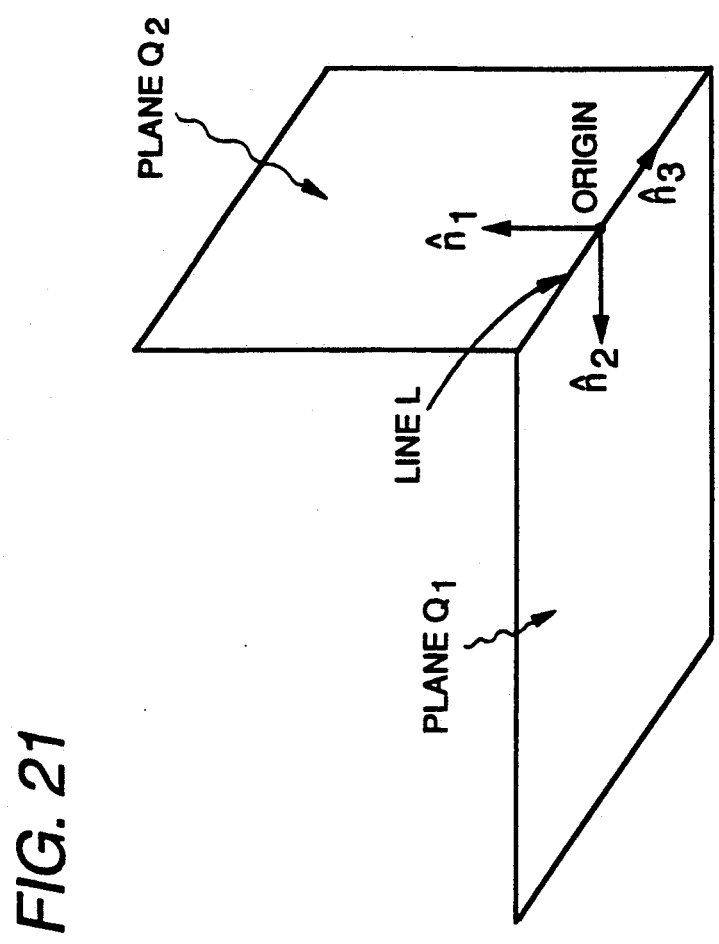
FIG. 21 depicts the intersection between two orthogonal planes.

With reference to FIG. 21, it will be shown that vector |OP| of FIG. 11 is orthogonal to plane Q which intersects plane W at line U in FIG. 11. Define two planes $Q_1$ and $Q_2$ such that:

$\hat{n}_1$ = unit normal to $Q_1$ $\hat{n}_2$ = unite normal to $Q_2$ $\hat{n}_1 \perp \hat{n}_2$ Let $Q_1$ an $Q_2$ intersect at line L. Without loss of generality let the origin be on line L.

Since $\hat{n}_1 \perp \hat{n}_2$, and $\hat{n}_1 \perp Q_1$, therefore $\hat{n}_2 \epsilon Q_1$.

In a similar manner one can show that $n_1 \epsilon Q_2$.

Let $\hat{n}_3$ be a unit vector along line L.

$n_3 \epsilon L \subset Q_1 \rightarrow \hat{n}_3 \perp \hat{n}_1$ $n_3 \epsilon L \subset Q_2 \rightarrow \hat{n}_3 \perp \hat{n}_2$ Hence the set $\{\hat{n}_1, \hat{n}_2, \hat{n}_3\}$ forms an orthonormal basis of the space. Also, $Q_1$ is spanned by $\hat{n}_2$ and $\hat{n}_3$, and $Q_2$ is spanned by $\hat{n}_1$ and $\hat{n}_3$.

Let $\underline{P}$ be any point on $Q_1$. Then $\underline{P} = \lambda_2 \hat{n} + \lambda_3 \hat{n}_3$ for some scalars $\lambda_2$ and $\lambda_3$. Let $\underline{P}' = \lambda_1' \hat{n}_1 + \lambda_3' \hat{n}_3$ be the point on $Q_2$ closest to $\underline{P}$ on $Q_2$. Now $$|\underline{PP'}|^2 = \lambda_1'^2 + \lambda_2^2 + (\lambda_3 - \lambda_3')$$

For a fixed $\underline{P}$, the minimum of $|PP'|^2$ occurs at $\lambda_1' = 0$ and $\lambda_3' = \lambda_3$, i.e., $$P' = \lambda_3 \hat{n}_3$$

is a point on line L. Now $$\underline{PP'} = P - P'$$
$$= \lambda_2 \hat{n}_2$$

Thus it is obvious that PP' is orthogonal to line L and orthogonal to plane $Q_2$.

APPENDIX B

Analysis of the geometry of FIG. 20 in the Case 2 situation:

SC is along a

L is along b

Thus SC is orthogonal to L,

OS is along w

L is on the (u,v) plane

Thus OS is orthogonal to L

Since SC is orthogonal to L and OS is orthogonal to L, we conclude that the plane containing lines SC and OS is orthogonal to line L. Since L is along the b axis, this plane is the (c,a) plane through S. This plane contains the points, O, S, and C.

What is claimed is:

1. Method of producing a three-dimensional computerized tomography image of an object, comprising:

employing a cone beam x-ray source and a corresponding normalized detector plane having an origin and positioned with reference to said source to scan the object and obtain cone beam projection data, said cone beam projection data being in the form of line integrals through the object organized, for each of a plurality of x-ray source positions, as a two-dimensional data set on said detector plane, wherein each of said line integrals are perpendicular to a line defined between one of said source positions and said origin, determining values representing planar integrals on a set of planes $\phi_j$ in Radon space by, for each of the source positions $S_i$, defining in Radon space a corresponding spherical shell on which Radon data can be determined, intersections of the planes $\phi_j$ with the spherical shell corresponding to the source position $S_i$ defining a set of circles $D_{ij}$ on the spherical shell, and for each of the circles $D_{ij}$, defining a rotation axis as a line through the source position $S_i$, intersecting the circle $D_{ij}$, and orthogonal to the plane of the circle $D_{ij}$, defining a set of coaxial integration planes $Q_{ijk}$, each of the integration planes $Q_{ijk}$ containing the rotation axis and intersecting the circle $D_{ij}$ to define the location of a Radon datum point $R_{ijk}$, and the integration planes $Q_{ijk}$ intersecting the normalized detector plane on respective first lines $L_{ijk}$, and for each of the first lines $L_{ijk}$ on the normalized detector plane, rotating the corresponding integration plane $Q_{ijk}$ by a small rotation angle $\delta\beta$ to define a plane $Q_{ijk}'$, intersecting the normalized detector plane on a corresponding first line $L_{ijk}'$, integrating along the first lines $L_{ijk}$ and $L_{ijk}'$ to determine respective weighted first line integrals $J_{ijk}$ and $J_{ijk}'$, and dividing the difference between the weighted first line integrals $J_{ijk}$ and $J_{ijk}'$ by the rotation angle $\delta\beta$ to yield the radial derivative of the Radon datum at the point $R_{ijk}$; and performing an inverse Radon transform on said values representing planar integrals on the set of planes $\phi_j$ to reconstruct an image of the object.

2. A method in accordance with claim 1, wherein the planes $\phi_j$ comprise a set of coaxial planes containing a reference axis intersecting the origin; and the step of determining values representing planar integrals on the set of planes $\phi_j$ comprises, for each source position $S_i$ not on the reference axis, defining in Radon space a corresponding circle $G_i$ on the corresponding spherical shell in a plane containing the source position $S_i$ and perpendicular to the planes $\phi_j$, intersections of the planes $\phi_j$ and the circles $D_{ij}$ with the circle $G_i$ defining on the circle $G_i$ a plurality of points $P_{ij}$ corresponding to the circles $D_{ij}$, projecting the corresponding circle $G_i$ from the source position $S_i$ to a line $M_i$ on the normalized detector plane, the points $P_{ij}$ projecting to corresponding points $C_{ij}$ on the line $M_i$, and for each projected point $C_{ij}$ on the normalized detector plane, constructing second lines $L_{ijk}$ on the normalized detector plane at a plurality of orientations passing through the projected point, the second lines $L_{ijk}$ being intersections on the normalized detector plane of corresponding integration planes $Q_{ijk}$ each containing a rotation axis along a line passing through the source position $S_i$, the point $P_{ij}$, and the projected point $C_{ij}$, rotating each of the second lines $L_{ijk}$ on the normalized detector plane about the projected point $C_{ij}$ by a small angle $\delta\theta$ to define a second line $L_{ijk}'$ which is the intersection of a plane $Q_{ijk}'$ containing the rotation axis with the normalized detector plane, and determining the rotation angle $\delta\beta$ between the planes $Q_{ijk}$ and $Q_{ijk}'$ by geometry from the angle $\delta\theta$, integrating along the second lines $L_{ijk}$ and $L_{ijk}'$ to determine respective weighted second line integrals $J_{ijk}$ and $J_{ijk}'$, and dividing the difference between the weighted second line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

3. A method in accordance with claim 2, wherein the step of determining values representing planar integrals on the set of planes $\phi_j$ comprises, for each source position $S_i$ on the reference axis:

for each plane $\phi_j$ intersecting the spherical shell corresponding to the source position $S_i$ and defining a circle $D_{ij}$, projecting the circle $D_{ij}$ from the source position $S_i$ to a line $L_{ij}^*$ on the normalized detector plane, constructing parallel third lines $L_{ijk}$ on the normalized detector plane perpendicular to the line $L_{ij}^*$, the third lines $L_{ijk}$ being intersections on the normalized detector plane of corresponding integration planes $Q_{ijk}$ each containing a rotation axis along a line passing through the source position $S_i$ and orthogonal to the plane of the circle $D_{ij}$, translating each of the parallel third lines $L_{ijk}$ by a small distance to define a third line $L_{ijk}'$ which is the intersection of a plane $Q_{ijk}'$ containing the rotation axis with the normalized detector plane, and determining the rotation angle $\delta\beta$ between the planes $Q_{ijk}$ and $Q_{ijk}'$ by geometry from the distance between the third lines $L_{ijk}$ and $L_{ijk}'$, integrating along the third lines $L_{ijk}$ and $L_{ijk}'$ to determine respective weighted third line integrals $J_{ijk}$ and $J_{ijk}'$, and dividing the difference between the weighted third line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

4. A method in accordance with claim 1, wherein the planes $\phi_1$ comprise a set of coaxial planes containing a reference axis intersecting the origin; and the step of determining values representing planar integrals on the set of planes $\phi_j$ comprises, for each source position $S_i$ on the reference axis, for each plane $\phi_j$ intersecting the spherical shell corresponding to the source position $S_1$ and defining a circle $D_{ij}$, projecting the circle $D_{ij}$ form the source position $S_i$ to a line $L_{ij}^*$ on the normalized detector plane, constructing parallel second lines $L_{ijk}$ on the normalized detector plane perpendicular to the line $L_{ij}^*$, the second lines $L_{ijk}$ being intersections on the normalized detector plane of corresponding integration planes $Q_{ijk}$ each containing a rotation axis along a line passing through the source position $S_i$ and orthogonal to the plane of the circle $D_{ij}$, translating each of the parallel second lines $L_{ijk}$ by a small distance to define a second line $L_{ijk}'$ which is the intersection of a plane $Q_{ijk}'$ containing the rotation axis with the normalized detector plane, and determining the rotation angle $\delta\beta$ between the planes $Q_{ijk}$ and $Q_{ijk}'$ by geometry from the distance between the second lines $L_{ijk}$ and $L_{ijk}'$, integrating along the second lines $L_{ijk}$ and $L_{ijk}'$ to determine respective weighted second line integrals $J_{ijk}$ and $J_{ijk}'$, and dividing the difference between the weighted second line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

5. Apparatus for producing a three-dimensional computerized tomography image of an object, comprising:

a cone beam x-ray source and a corresponding normalized detector plane having an origin and being arranged such that said source and detector plane are operable to scan the object and obtain cone beam projection data, said cone beam projection data being in the form of line integrals through the object organized, for each of a plurality of x-ray source positions, as a two dimensional data set on said detector plane, wherein each of said line integrals are perpendicular to a line defined between one of said source positions and said origin.

means for determining values representing planar integrals on a set of planes $\phi_j$ in Radon space by, for each of the source positions $S_i$, means for defining in Randon space a corresponding spherical shell on which Radon data can be determined, intersections of the planes $\phi_j$ with the spherical shell corresponding to the source position $S_i$ defining a set of circles $D_{ij}$ on the spherical shell, and for each of the circles $D_{ij}$, means for defining a rotation axis as a line through the source position $S_i$, intersecting the circle $D_{ij}$, and orthogonal to the plane of the circle $D_{ij}$, means for defining a set of coaxial integration planes $Q_{ijk}$, each of the integration planes $Q_{ijk}$ containing the rotation axis and intersecting the circle $D_{ij}$ to define the location of a Radon datum point $R_{ijk}$, and the integration planes $Q_{ijk}$ intersecting the normalized detector plane on respective first lines $L_{ijk}$, and for each of the first lines $L_{ijk}$ on the normalized detector plane, means for rotating the corresponding integration plane $Q_{ijk}$ by a small rotation angle $\delta\beta$ to define a plane $Q_{ijk}'$, intersecting the normalized detector plane on a corresponding first line $L_{ijk}'$, means for integrating along the first lines $L_{ijk}$ and $L_{ijk}'$ to determine respective weighted first line integrals $J_{ijk}$ and $J_{ijk}'$, and means for dividing the difference between the weighted first line integrals $J_{ijk}$ and $J_{ijk}'$ by the rotation angle $\delta\beta$ to yield the radial derivative of the Radon datum at the point $R_{ijk}$; and means for performing an inverse Radon transform on said values representing planar integrals on the set of planes $\phi_j$ to reconstruct an image of the object.

6. Apparatus in accordance with claim 5, wherein the planes $\phi_j$ comprise a set of coaxial planes containing a reference axis intersecting the origin; and said means for determining values representing planar integrals on the set of planes $\phi_j$ including, for each source position $S_i$ not on the reference axis, means for defining in Radon space a corresponding circle $G_i$ on the corresponding spherical shell in a plane containing the source position $S_i$ and perpendicular to the planes $\phi_j$, intersections of the planes $\phi_j$ and the circles $D_{ij}$ with the circle $G_i$ defining on the circle $G_i$ a plurality of points $P_{ij}$ corresponding to the circle $D_{ij}$, means for projecting the corresponding circle $G_i$ from the source position $S_i$ to a lien $M_i$ on the normalized detector plane, the points $P_{ij}$ projecting to corresponding point $C_{ij}$ on the line $M_i$, and for each projected point $C_{ij}$ on the normalized detector plane, means for constructing second lines $L_{ijk}$ on the normalized detector plane at a plurality of orientations passing through the projected point, the second lines $L_{ijk}$ being intersections on the normalized detector plane of corresponding integration planes $Q_{ijk}$ each containing a rotation axis along a line passing through the source position $S_i$, the point $P_{ij}$, and the projected point $C_{ij}$, means for rotating each of the second lines $L_{ijk}$ on the normalized detector plane about the projected point $C_{ij}$ by a small angle $\delta\theta$ to define a second line $L_{ijk}'$ which is the intersection of a plane $Q_{ijk}'$ containing the rotation axis with the normalized detector plane, and determining the rotation angle $\delta\beta$ between the planes $Q_{ijk}$ and $Q_{ijk}'0$ by geometry from the angle $\delta\theta$, means for integrating along the second lines $L_{ijk}$ and $L_{ijk}'$ to determine respective weighted second line integrals $J_{ijk}$ and $J_{ijk}'$, and means for dividing the difference between the weighted second line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

7. Apparatus in accordance with claim 6, wherein said means for determining values representing planar integrals on the set of planes $\phi_j$ includes, for each source position $S_i$ on the reference axis:

for each plane $\phi_j$ intersecting the spherical shell corresponding to the source position $S_i$ and defining a circle $D_{ij}$, means for projecting the circle $D_{ij}$ from the source position $S_i$ to a line $L_{ij}^*$ on the normalized detector plane, means for constructing parallel third lines $L_{ijk}$ on the normalized detector plane perpendicular to the line $L_{ij}*$, the third lines $L_{ijk}$ being intersections on the normalized detector plane of corresponding integration planes $Q_{ijk}$ each containing a rotation axis along a line passing through the source position $S_i$ and orthogonal to the plane of the circle $D_{ij}$, means for translating each of the parallel third lines $L_{ijk}$ by a small distance to define a third line $L_{ijk}'$ which is the intersection of a plane $Q_{ijk}'$ containing the rotation axis with the normalized detector plane, and determining the rotation angle $\delta\beta$ between the planes $Q_{ijk}$ and $Q_{ijk}'$ by geometry from the distance between the third lines $L_{ijk}$ and $L_{ijk}'$, means for integrating along the third lines $L_{ijk}$ and $L_{ijk}'$ to determine respective weighted third line integrals $J_{ijk}$ and $J_{ijk}'$, and means for dividing the difference between the weighted third line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

8. A method in accordance with claim 5, wherein the planes $\phi_j$ comprise a set of coaxial planes containing a reference axis intersecting the origin; and said means for determining values representing planar integrals on the set of planes $\phi_j$ including, for each source position $S_i$ not on the reference axis, for each plane $\phi_j$ intersecting the spherical shell corresponding to the source position $S_i$ and defining a circle $D_{ij}$, means for projecting the circle $D_{ij}$ from the source position $S_i$ to a line $L_{ij}*$ on the normalized detector plane, means for constructing parallel second lines $L_{ijk}$ on the normalized detector plane perpendicular to the line $L_{ij}*$, the second lines $L_{ijk}$ being intersections on the normalized detector plane of corresponding integration planes $Q_{ijk}$ each containing a rotation axis along a line passing through the source position $S_i$ and orthogonal to the plane of the circle $D_{ij}$, means for translating each of the parallel second lines $L_{ijk}$ by a small distance to define a second line $L_{ijk}'$ which is the intersection of a plane $Q_{ijk}'$ containing the rotation axis with the normalized detector plane, and determining the rotation angle $\delta\beta$ between the planes $Q_{ijk}$ and $Q_{ijk}'$ by geometry from the distance between the second lines $L_{ijk}$ and $L_{ijk}'$, means for integrating along the second lines $L_{ijk}$ and $L_{ijk}'$ to determine respective weighted second line integrals $J_{ijk}$ and $J_{ijk}'$, and means for dividing the difference between the weighted second line integrals $J_{ijk}$ and $J_{ijk}'$ by the rotation angle $\delta\beta$ to yield the radial derivative of the Radon datum at a point on the circle $D_{ij}$ where the plane $Q_{ijk}$ intersects the circle $D_{ij}$.

* * * * *